United States Patent [19]

Sakamoto

[11] Patent Number: 4,623,926
[45] Date of Patent: Nov. 18, 1986

[54] TELEVISION SYNCHRONOUS RECEIVER

[75] Inventor: Yoichi Sakamoto, Takatsuki, Japan

[73] Assignee: Matsushita Electric Industrial Co., Ltd., Kadoma, Japan

[21] Appl. No.: 550,221

[22] Filed: Nov. 9, 1983

[30] Foreign Application Priority Data

Nov. 12, 1982 [JP] Japan .................................. 57-199186
Dec. 1, 1982 [JP] Japan .................................. 57-211718
Dec. 21, 1982 [JP] Japan .................................. 57-225344
Jun. 24, 1983 [JP] Japan .................................. 58-114801
Jun. 24, 1983 [JP] Japan .................................. 58-114802

[51] Int. Cl.$^4$ ........................ H04N 5/44; H04N 5/50
[52] U.S. Cl. .................................. 358/188; 358/193.1
[58] Field of Search ................. 358/188, 191.1, 193.1, 358/195.1

[56] References Cited

U.S. PATENT DOCUMENTS 3,688,019  8/1972  Weitzsch et al.
4,461,035  7/1984  Sakamoto ........................ 358/193.1
4,524,389  6/1985  Isobe .................................. 358/188

FOREIGN PATENT DOCUMENTS 1266759  3/1972  United Kingdom.
1451337  9/1976  United Kingdom.
2022959  12/1979  United Kingdom.
2106734  4/1983  United Kingdom.

OTHER PUBLICATIONS

R. Deubert, "Feature IC's for Digivision TV Sets", 1983, Freiberg, West Germany, pp. 237-241.
S. Haykin, "Communication Systems," Second Edition, Jun. 1983, New York, pp. 132-133.
O. Limann, "Fernsehtechnik Ohne Ballast", 1983, pp. 55-57 (no Translation).
V. Jan Davidse, "Synchrondemodulation von Fernschsignalen", 1969, pp. 525-530 (no Translation).
P. Draheim, "Digitaltechnik im Fernsehgerat", 1982, pp. 96-98 (no Translation).
Teil 1, "Phasenregelkreis" (PLL), Grundschaltengen der Elektronik, Funkschau-Arbeitsblatter, pp. 61-62, 67-68, 1983.
Michael Jacobse, "Adaptive Techniken bei der Digitalen Videosignalverarbeitung in Farbfernsehempfangern", pp. 245-250.
Robert Suhrmann, "Neue Fernsehempfanger-Konzeptionen", 1983, pp. 329-334.

Primary Examiner—Tommy P. Chin
Attorney, Agent, or Firm—Wenderoth, Lind & Ponack

[57] ABSTRACT

A television synchronous receiver includes: a voltage controlled oscillator; a 90° phase shifter for shifting the phase of the voltage controlled oscillator output by 90°; first and second synchronous detectors for synchronously detecting in-phase and quadrature components of a video carrier signal using the voltage controlled oscillator output and the 90° phase shifter output as synchronous carriers; first and second low-pass filters for filtering low frequency components of the first and second synchronous detector outputs within frequency ranges covering the base band of video and sound intermediate frequency signals; a phase detector for detecting the phase difference between the video carrier signal and the voltage controlled oscillator output from the first and second low-pass filter outputs; a circuit for feeding the phase detector output back to the voltage controlled oscillator; a signal amplifier for amplifying the first low-pass filter output; a signal converter for converting the signal amplifier output into a discrete-time signal; a clock generator for generating clock signals under the control of either television synchronizing signals or color burst signals separated from the signal amplifier output; a discrete-time system for processing the discrete-time signals and a signal reverse converter for reverse converting the discrete-time system output into continuous time signals. The receiver minimizes interference from an adjacent lower channel through the operation of the discrete-time system and generates video signals from the reverse converter without needing a varactor and inductor tuning circuit at the high frequency input section for removing adjacent lower channel signals.

22 Claims, 35 Drawing Figures

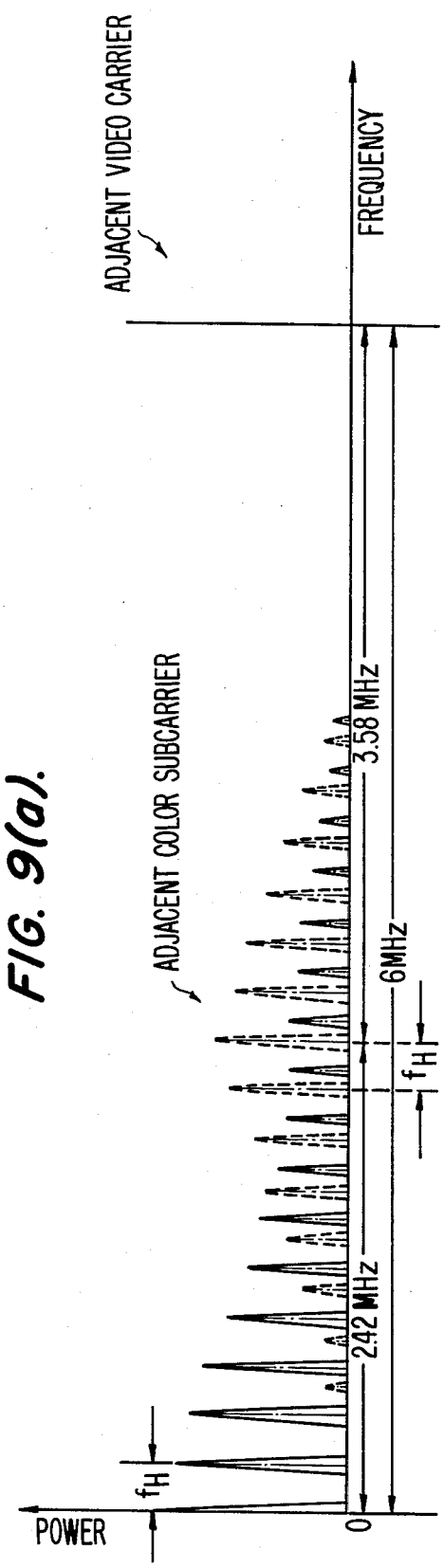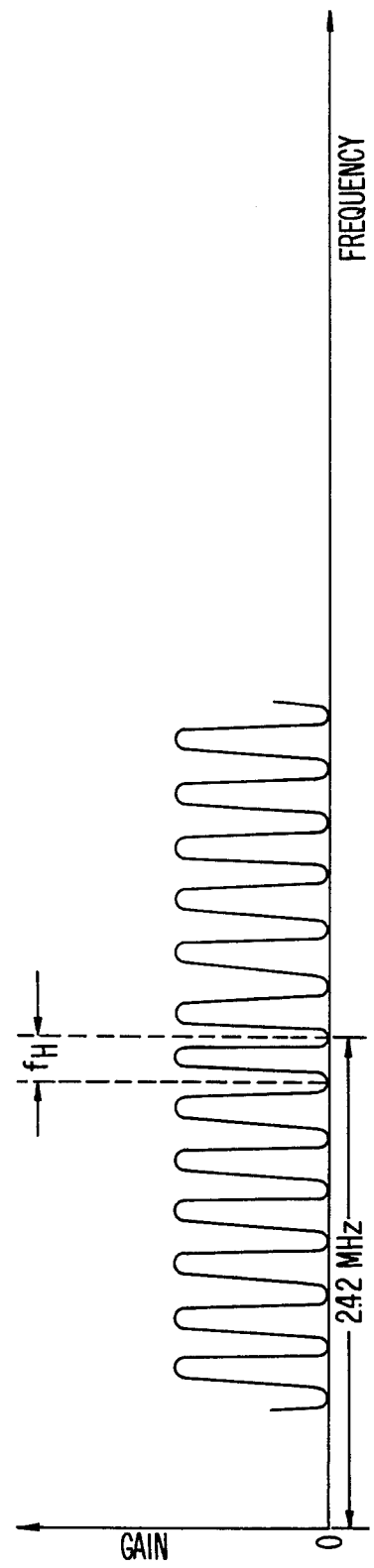

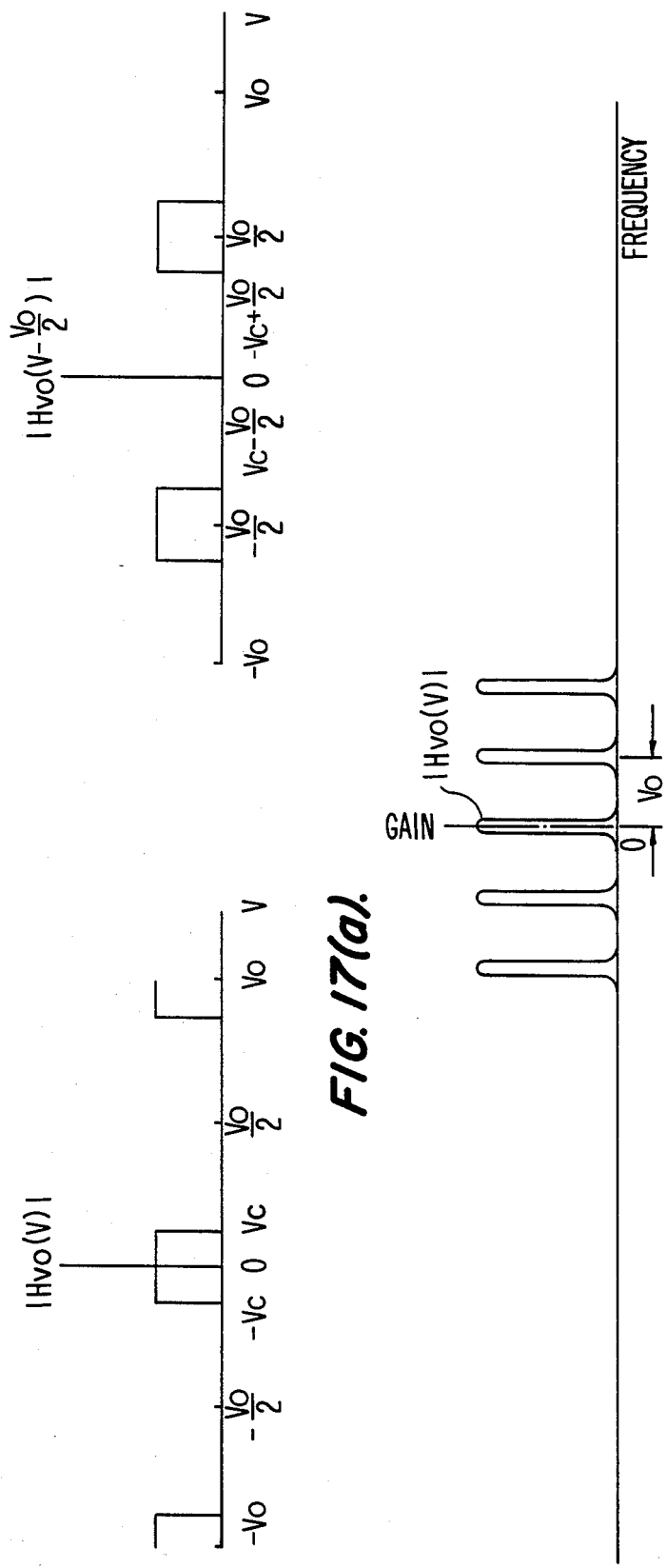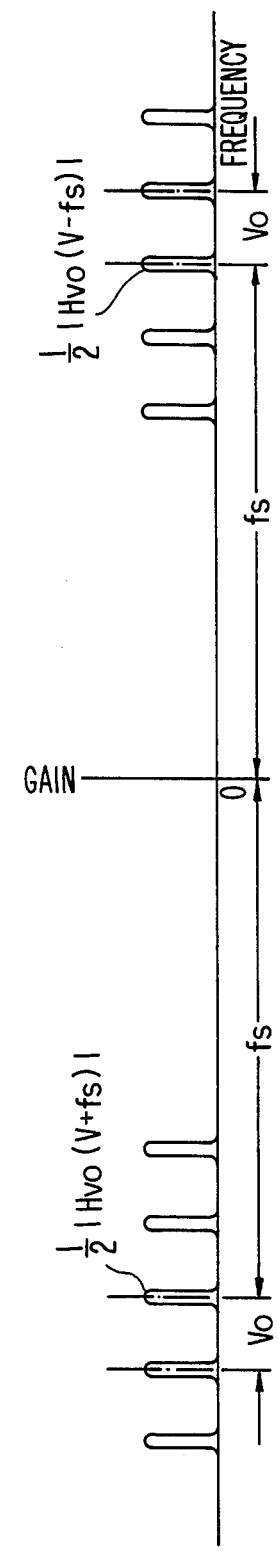

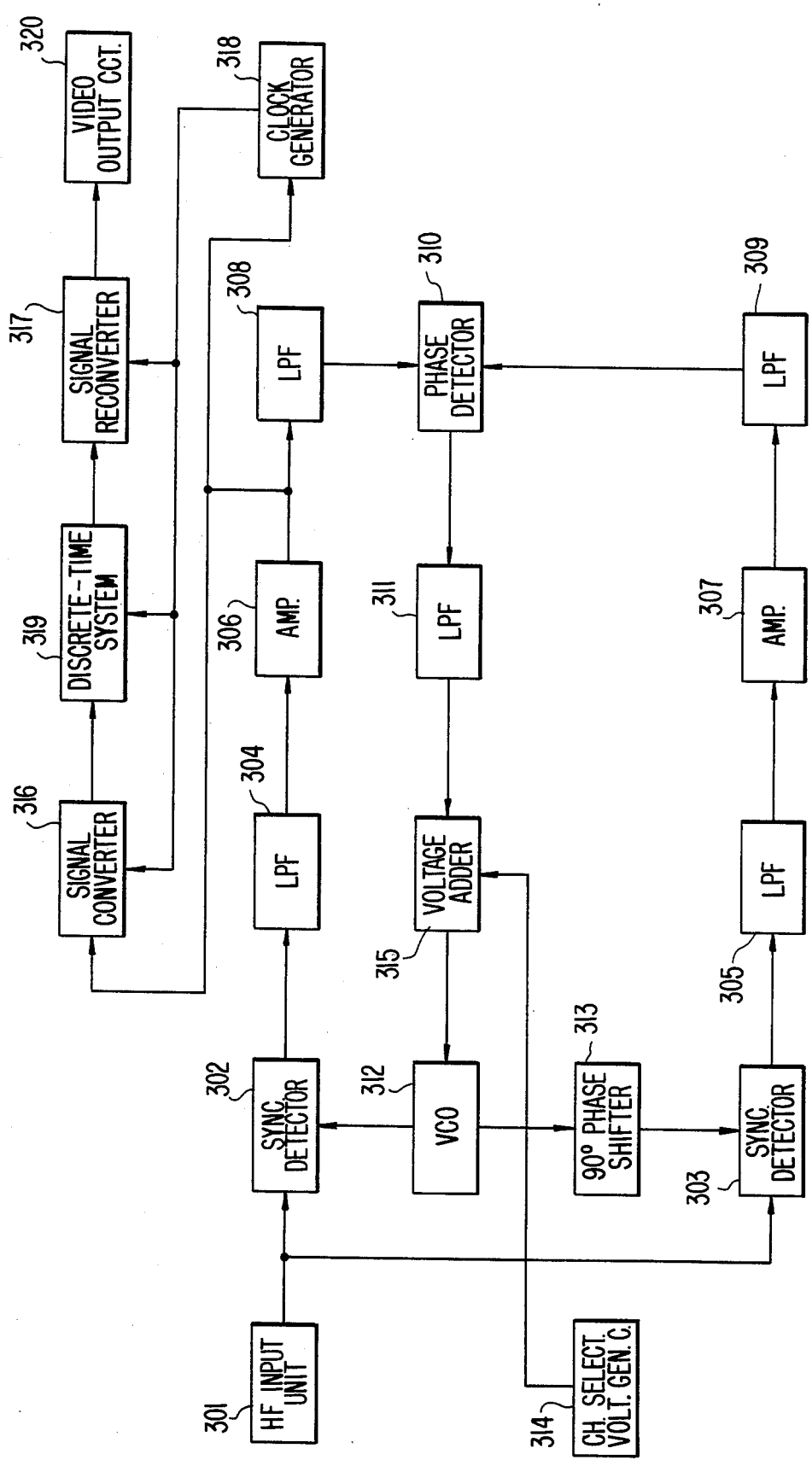

TELEVISION SYNCHRONOUS RECEIVER

BACKGROUND OF THE INVENTION

1. Field of the Invention

The present invention relates to a television synchronous receiver for use as a television receiver and a VTR video tuner.

2. Description of the Prior Art

Recent years saw a wide-spread use of the so-called electronic tuner employing variable capacitance diodes as tuning elements in television receivers and VTR video tuners. The electronic tuner is advantageous in that being a contactless device, it is free from the trouble caused by defective contacts and because it can be electronically controlled, it can be used conveniently in remote control and other applications demanding multiple functions. However, because of the inherent variation in characteristics of the variable capacitance diodes and the need for an inductance in tuning, the electronic tuner presents problems when one aspires to a non-adjustment manufacturing process and automation.

Therefore, it might be contemplated to employ a synchronous receiving system for the purpose of constructing an easily integratable receiver without using variable capacitance diodes and inductors. While a variety of synchronous receiving systems are available, a carrier recovery system is suitable for the tuning of a synchronous carrier with feeble television signals. This system is known as the Costas loop system.

FIG. 1 is a block diagram showing main parts of a carrier recovery system synchronous receiver utilizing the Costas loop system. Its construction comprises a first synchronous detector 1 for synchronous detection of the in-phase component of a modulated carrier input, a second synchronous detector 2 for synchronous detection of the quadrature component thereof, low pass filters 3 and 4 for low-pass filtering of the outputs of said two synchronous detectors 1 and 2, a phase detector 5 for detecting the phase of the synchronous carrier with respect to the modulated carrier by multiplying the output voltages of said two low pass filters 3 and 4, a low pass filter for filtering the output of said phase detector, a voltage controlled oscillator 7 which is controlled by the output of said low pass filter 6, and a 90° phase shifter for shifting the output of said voltage controlled oscillator by 90°.

In this Costas loop synchronous receiver, the in-phase and quadrature signal components available from the first and second synchronous detectors 1 and 2 are added to the phase detector 5. A voltage proportional to the phase error between the receiver input which is the modulated carrier, and the output of the voltage controlled oscillator, which is the synchronous carrier, is obtained from said phase detector and this voltage is fed back to the voltage controlled oscillator 7 so as to reduce the phase error to 0.

By applying this prior art system directly to a television receiver, it is possible to obtain the base band video signal of the desired receiving channel by synchronous detection and also, the sound intermediate frequency signal but the chrominance signal and sound signal of the lower adjacent channel are also generated at the same time. The chrominance signal and sound signal of the lower adjacent channel find their way as interference signals into the base band video signal.

To solve this problem, it might be contemplated to provide a tuning circuit consisting of a variable capacitance diode and an inductor at the high frequency input but such an arrangement would defeat the initial objective of constructing a receiver without enlisting the help of such elements.

SUMMARY OF THE INVENTION

It is an object of the present invention to provide a television synchronous receiver which eliminates interference due to television signals of an adjacent lower channel when television signals are received in a synchronous manner by a Costas loop.

It is another object of the present invention to provide a television synchronous receiver which eliminates interference of carrier chrominance components and carrier sound signals of an adjacent lower channel with base band video signals of a desired receiving channel.

It is still another object of the present invention to provide a television synchronous receiver which eliminates interference of noise components remaining at the output of a phase detector after low-pass filtering with video signals and sound signals demodulated.

It is yet another object of the present invention to provide a television synchronous receiver which removes signals within a frequency band free of a luminance signal spectrum from base band video signals.

According to the present invention, there is provided a television synchronous receiver which comprises a voltage controlled oscillator, a 90° phase shifter for shifting the phase of the output of said voltage controlled oscillator by 90°, first and second synchronous detectors for synchronously detecting an in-phase component and quadrature component of a video carrier signal using the output of said voltage controlled oscillator and the output of said 90° phase shifter as synchronous carriers, first and second low-pass filters for filtering low frequency components of the outputs of said first and second synchronous detectors within frequency ranges covering the base band of a video signal and a sound intermediate frequency signal, a phase detector for detecting the phase difference between said video carrier signal and the output of said voltage controlled oscillator from the outputs of said first and second low-pass filters, means for feeding the output of said phase detector back to said voltage controlled oscillator, a signal amplifier for amplifying the output of said first low-pass filter, a signal converter for converting the output of said signal amplifier into a discrete-time signal, a clock generator for generating clock signals under control of either television synchronizing signals or color burst signals as separated from the output of said signal amplifier, a discrete-time system for processing said discrete-time signals and a signal reverse converter for reverse converting the output of said discrete-time system into continuous time signals. This makes it possible to minimize interference from an adjacent lower channel through the operation of the discrete-time system and generates video signals from the reverse converter without the provision of a tuning circuit of a varactor and an inductor at the high frequency input section for the removal of signals of an adjacent lower channel.

BRIEF DESCRIPTION OF THE DRAWINGS

FIG. 9(a) shows a video signal spectrum of a desired receiving channel and a carrier chrominance signal spectrum of its adjoining lower channel;

FIG. 9(b) is a characteristic chart of a comb-shaped filter used with the present invention;

FIG. 16(a) shows a frequency response of an ideal low-pass filter;

FIG. 16(b) shows the frequency response of the ideal low-pass filter shifted by $vo/2$;

FIG. 17 shows low-pass filter characteristics shifted by the frequency $f_s$;

FIG. 23 is a schematic block diagram of a combination of the respective embodiments of FIGS. 2, 10, 15 and 22.

DETAILED DESCRIPTION OF THE INVENTION

Figure 2:
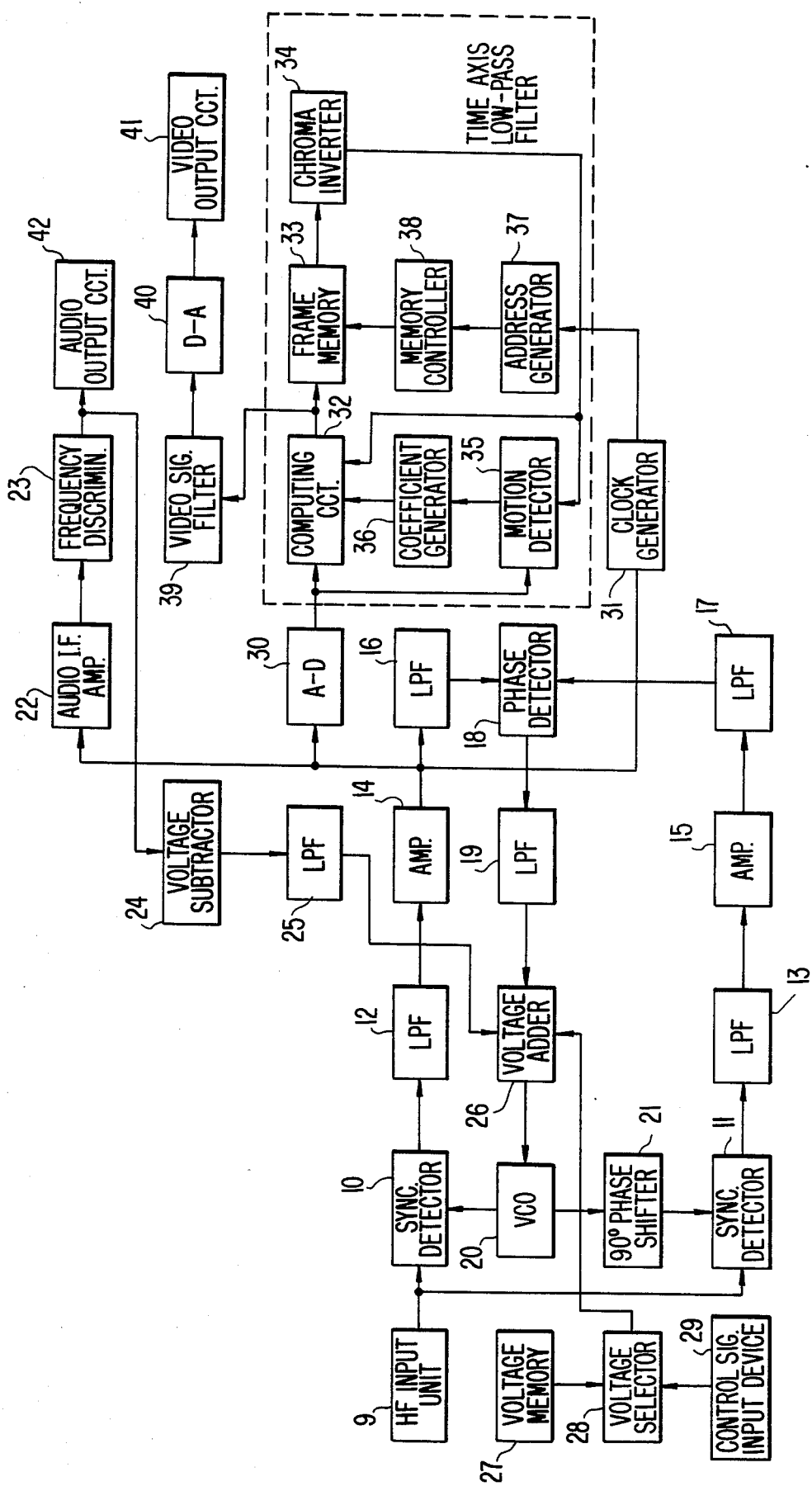
FIG. 2 is a schematic block diagram of an embodiment of the present invention.

Specific embodiments of the present invention will now be described with reference to the drawings. FIG. 2 is a schematic block diagram of a television synchronous receiver according to an embodiment of the present invention, wherein a Costas loop is set up by a high frequency input section 9, a first synchronous detector 10, a second synchronous detector 11, first and second low-pass filters 12 and 13, signal amplifiers 14 and 15, third and fourth low-pass filters 16 and 17, a phase detector 18, a Costas loop low-pass filter 19, a voltage controlled oscillator 20 and a 90° phase shifter 21. A frequency pull in circuit includes a sound IF amplifier 22, a frequency discriminator 23, a voltage subtractor 24, and a low-pass filter 25. The output of the frequency pull in circuit is added to the output of the Costas loop low-pass filter 19 through the voltage adder 26. A voltage memory 27, a voltage selector 28 and a control input device 29 form a tuning voltage generator. Furthermore, the output voltage of the voltage selector 28 is added to the output of the Costas loop low-pass filter 19 through the voltage adder 26. An A-D converter 30 converts the output of the signal amplifier 14 from analog to digital form. A clock generator 31 separates television synchronizing signals or color burst signals from the output of the signal amplifier 14 and generates clock signals under control of either of the signals so separated. A computing circuit 32 adds the output of the A-D converter 30 multiplied by 1-K to the output of a frame memory 33 multiplied by K, the frame memory 33 storing the output of the computing circuit every frame. There are further provided a chrominance inverter 34 for inverting the phase of chrominance signals of television signals in the frame memory every frame, a motion detector 35 for detecting a frame-to-frame motion in an image from the difference between the output of the chrominance inverter and the output of the A-D converter 30, a coefficient generator 36 for determining the coefficient K as a function of the output of the motion detector, an address generator 37 for determining the address of the frame memory depending upon the clock signals from the clock generator 31 and a memory control 38 for writing and erasing of the frame memory as addressed by the address generator, thus establishing a motion-adaptive time axis low-pass filter. There are further provided a video signal filter 39, a D-A converter 40 for converting the output of the video signal filter from digital to analog, a video output circuit 41 and a sound output circuit 42.

The television synchronous receiver according to the above-described embodiment will operate in the following manner. Assume now that $v_v(t)$ is the video carrier signal of the desired receiving channel applied to the high frequency input section and $v_s(t)$ is the sound carrier signal. $v_v(t)$ can be written as follows because it is vestigial side-band modulated.

$$v_v(t) = Re\ \{[I(t) + jQ(t)]\ \exp j\ [\omega_v t + \phi_v]\} \quad (1)$$

$$= I(t)\cos(\omega_v t + \phi_v) - Q(t)\sin(\omega_v t + \phi_v)$$

Re is the real component of the function in the parenthesis, I(t) is the in-phase component with respect to the carrier, including video signals, Q(t) is the quadrature component with respect to the carrier, $\omega_v$ is the angular frequency of the video carrier and $\phi_v$ is the phase of the video carrier.

It is further assumed that narrow band gauss noise n(t) is defined as follows and $v_v(t)$ and n(t) as defined above are applied to one of terminals of the first or second synchronous detector 10 or 11.

$$n(t) = n_c(t)\cos(\omega_v t + \phi_v) - n_s(t)\sin(\omega_v t + \phi_v) \quad (2)$$

If the output of the voltage controlled oscillator 20 is $$v_o(t) = A_o\cos(\omega_o t + \phi_o) \quad (3)$$

and is applied to the other terminal of the first synchronous detector 10 consisting of a voltage multiplier, then the output $V_{pv}(t)$ there of is as follows:

$$v_{pv}(t) = A_o[\omega_v(t) + n(t)]\cos(\omega_o t + \phi_o) \quad (4)$$

$$= \frac{A_o}{2}[I(t) + n_c(t)]\{\cos[(\omega_v + \omega_o)t + \phi_v + \phi_o] +$$

$$\cos[(\omega_v - \omega_o)t + \phi_v + \phi_o]\} - \frac{A_o}{2}[Q(t) + n_s(t)]\{\sin[(\omega_v +$$

$$\omega_o)t + \phi_v + \phi_o] + \sin[(\omega_v - \omega_o)t + \phi_v - \phi_o]\}$$

Since $\omega_o = \omega_v$ when the output of the voltage controlled oscillator is synchronous with the video carrier, $$V_{pv}(t) = \frac{A_o}{2}[I(t) + n_c(t)]\{\cos(2\omega_v t + \phi_v + \phi_o) + \cos(\phi_v - \quad (5)$$

$$\phi_o)\} - \frac{A_o}{2}[Q(t) + n_s(t)]\{\sin(2\omega_v t + \phi_v + \phi_o) + \sin(\phi_v + \phi_o)\}$$

Removing the signal 2 $\omega_v$ through the low-pass filter 12, $$V_{pv}(t) = \frac{A_o}{2}[I(t) + n_c(t)]\cos\phi - \frac{A_o}{2}[Q(t) + n_s(t)]\sin\phi \quad (6)$$

The angle $\phi$ is $\phi_v - \phi_o$ and is the phase difference between the video carrier and the output of the voltage controlled oscillator. If $\phi = 0$, then $$V_{pv}(t) = \frac{A_o}{2}[I(t) + n_c(t)] \quad (7)$$

That is, the in-phase component of the signal and noise are detected as the output of the detector for the video carrier. However, the quadrature component is not detected. The outputs thus detected are applied as the video detector output by the signal amplifier 14 via the D-A converter 40 and delivered to the time axis low-pass filter discussed later. The filtering property of the low-pass filter 12 is plotted in FIG. 3. As shown therein, the base band of the video signals is filtered. In the case where television signals are received in the conventional superheterodyne receiver system, the overall base-band frequency characteristic may be regarded as flat because of the Nyquist filtering property of its IF amplifier. Nevertheless, the characteristic should be regarded as one shown in FIG. 4(a) in the case of the synchronous receiver system as in the present invention. In other words, the voltage gain at a low frequency region is twice the gain at a high frequency regions. In the embodiment of FIG. 2, the frequency characteristic of the video signal amplifier 39 compensates for this discrepancy as seen in FIG. 4(b).

The sound carrier signal $V_s(t)$ of television broadcasts can be represented below because it is frequency modulated.

$$V_s(t) = A_s\cos[\{\omega_s + s(t)\}t + \phi_s] \quad (8)$$

where As is the amplitude of the sound carrier signal, $\omega_s$ is the angular frequency of the sound carrier signal, s(t) is the sound signal and $\phi_s$ is the phase of the sound carrier signal.

If $V_s(t)$ and $V_o(t)$ in equation (3) are applied to the synchronous detector 10, then the output thereof is $$V_{ps}(t) = A_s\cos[\{\omega_s + S(t)\}t + \phi_s]A_o\cos(\omega_o t + \phi_o) \quad (9)$$

$$= \frac{A_sA_o}{2}\cos[(\omega_s + \omega_o)t + S(t)t + \phi_s + \phi_o]$$

$$+ \frac{A_sA_o}{2}\cos[(\omega_s - \omega_o)t + S(t)t + \phi_s - \phi_o]$$

Removing frequency components $\omega_s + \omega_o$ through the low-pass filter 12, $$V_{ps}(t) = \frac{A_sA_o}{2}\cos[(\omega_s - \omega_o)t + S(t)t + \phi_s - \phi_o] \quad (10)$$

If $\omega_{IF} = \omega_s - \omega_o$, $\omega_o = \omega_v$, $$V_{ps}(t) = \frac{A_sA_o}{2}\cos[\{\omega_{IF} + S(t)\}t + \phi_s - \phi_o] \quad (11)$$

$V_{ps}(t)$ in equation (10) is the very sound carrier signal in equation (8) which is converted into a sound IF signal with an angular frequency $\omega_{IF}$.

Figure 3:
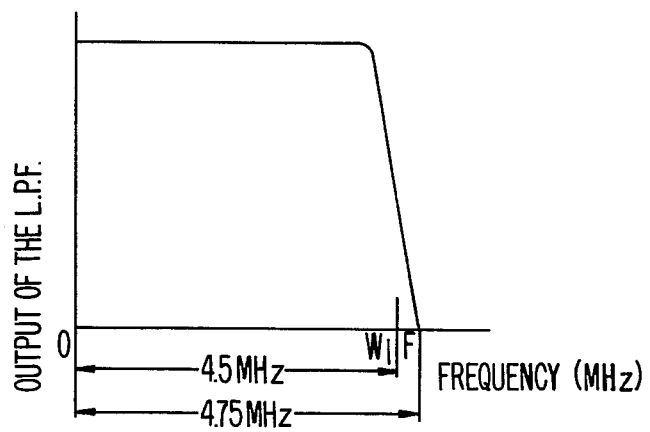
FIG. 3 is a frequency characteristic chart of a low-pass filter for filtering the output of a synchronous detector.
Figure 4A:
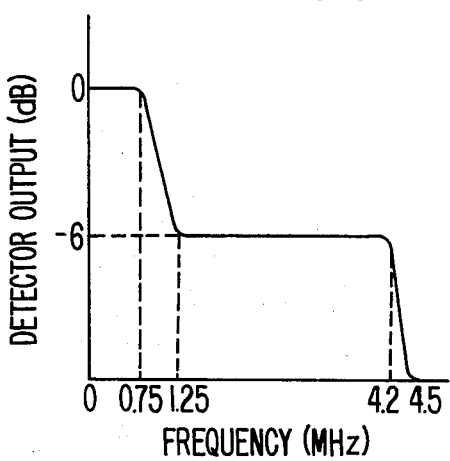
FIG. 4(a) is a base band frequency characteristic chart of video signals.
Figure 4B:
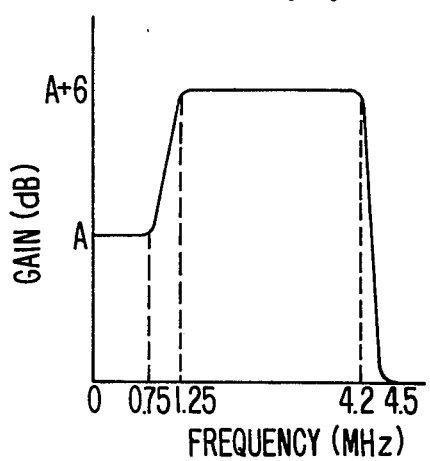
FIG. 4(b) is a frequency characteristic chart of a video signal filter.

The filtering property of the low-pass filter 12, as indicated in FIG. 3, covers the frequency $\omega_{IF}$ of the sound IF signal. The sound IF signal is amplified by the signal amplifier 14 and the sound IF amplifier 22 via the low-pass filter 12. The output thereof is demodulated through the frequency discriminator 23, providing the sound signal s(t) which in turn is fed to the sound output circuit 42.

Figure 5A:
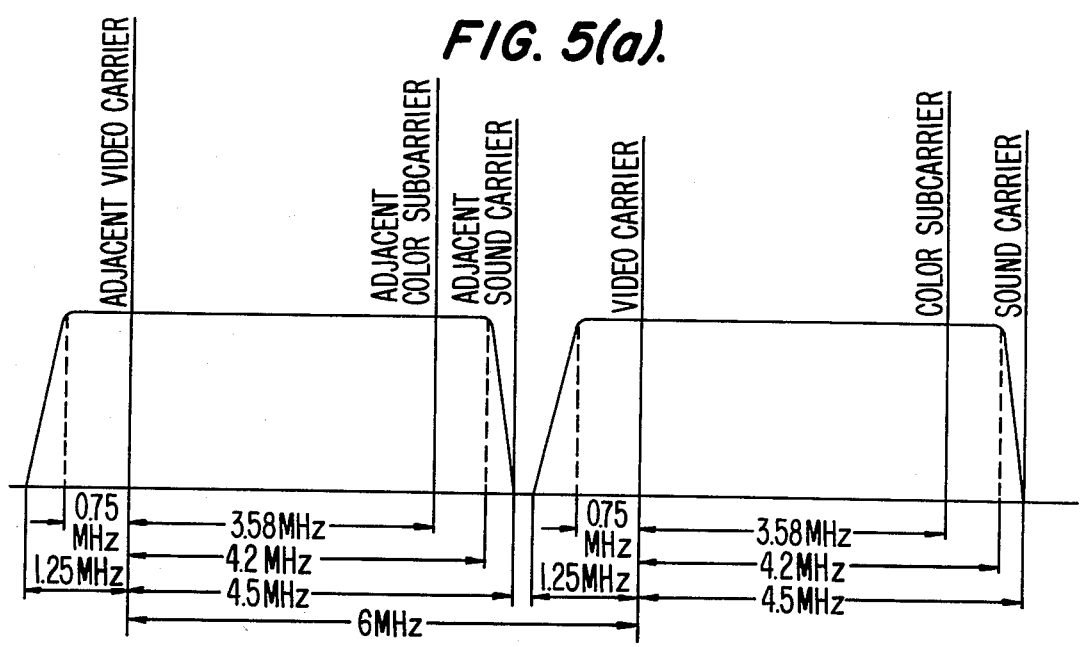
FIG. 5(a) is a diagram showing the frequency relationships between a desired channel in which television signals are to be received and its adjoining lower channel.
Figure 5B:
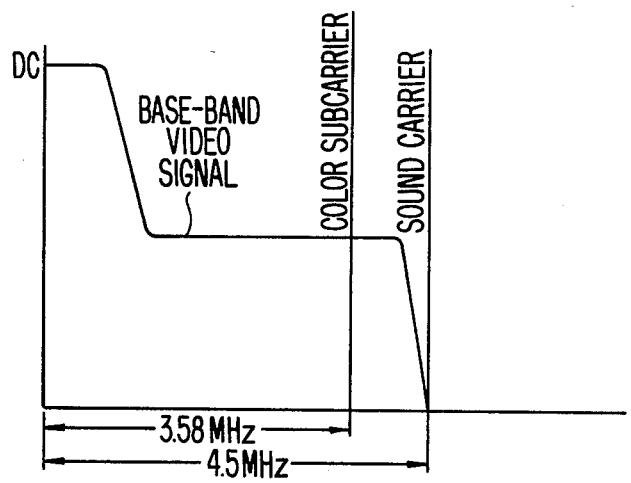
FIG. 5(b) is a diagram showing frequency conversion in a desired receiving channel.

Television signals transmitted consist of signals bearing frequency relationships as shown in FIG. 5(a), wherein the desired receiving channel is shown on the right side and the adjacent lower channel on the left side. The television signals of the desired receiving channel are synchronously detected by the synchronous detector 10 and converted into a base-band video signal, a carrier chrominance signal and a carrier sound signal as depicted in FIG. 5(b), whereas the television signals of the adjacent lower channel are likewise converted into an adjacent carrier video signal, an adjacent carrier chrominance signal and an adjacent carrier sound signal.

Figure 5C:
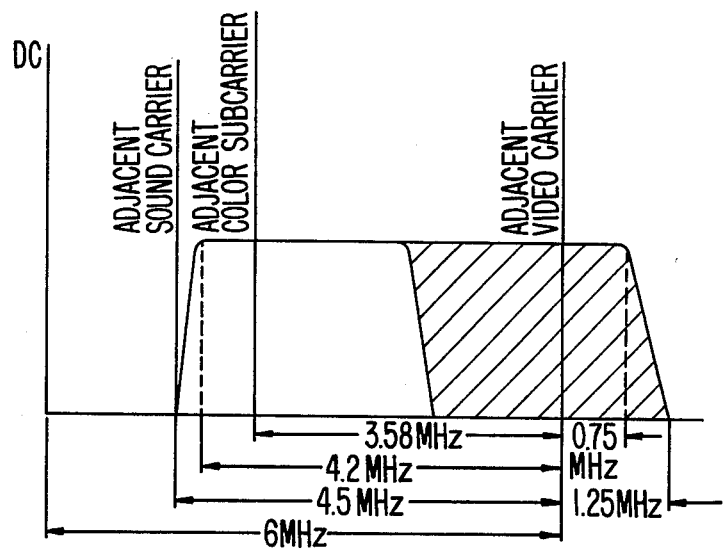
FIG. 5(c) is a diagram showing frequency conversion in its adjoining lower channel.

The shaded area of FIG. 5(c) is trimmed off when the output of the synchronous detector 10 passes through the low pass filter 12. This area includes a major portion of the adjacent carrier video signal. However, the signal in the area other than the shaded area of FIG. 5(c) is included in the baseband video signal of FIG. 5(b). The operation to remove this adjacent carrier video signal finding its way into the baseband video signal and the adjacent carrier sound signal is explained below.

The output $V_o(t)$ of the 90° shifter has a phase difference of 90° from the output of the voltage controlled oscillator 20.

$$V_\alpha(t) = A_\alpha \sin(\omega_\alpha t + \phi_\alpha) \tag{12}$$

This, together with $V_v(t)$, is applied to the second synchronous detector 11 comprising a voltage multiplier and the output thereof $V_{pQ}(t)$ is passed through the low pass filter 13. As in the case of equation (6), the following relationship holds.

$$V_{PQ}(t) = -\frac{A_o}{2}[I(t) + n_c(t)]\cos\phi - \frac{A_o}{2}[Q(t) + n_s(t)]\sin\phi \tag{13}$$

where $\omega_o = \omega_v$. This $V_{pQ}(t)$ is amplified in a signal amplifier 15 and added to a phase detector 18. In this phase detector 18 comprising a voltage multiplier, $V_{pv}(t)$ and $V_{pQ}(t)$ are voltage-multiplied, whereby a control voltage $V_c(t)$ is generated.

$$V_c(t) = v_{pv}(t) - v_{pq}(t) \tag{14}$$

$$= -\frac{A^2_o}{8}\{[I(t) + n_c(t)]^2 - [Q(t) + n_s(t)]^2\}\sin\theta -$$

$$\frac{A^2_o}{4}[I(t) + n_c(t)][Q(t) + n_s(t)]\cos$$

The angle $\theta = 2\phi$, provided that the amplication factor of the first and second signal amplifier is now assumed to be 1.

Figure 6A:
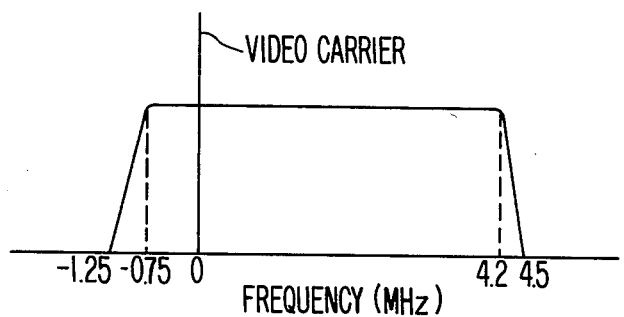
FIG. 6(a) is a characteristic chart of vestigial side-band transmission of television signals.
Figure 6B:
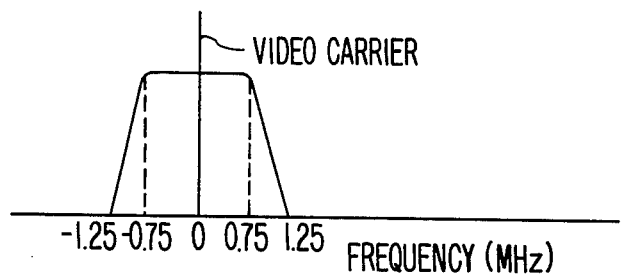
FIG. 6(b) is a characteristic chart showing double side-band transmission during the vestigial side-band transmission of television signals.
Figure 6C:
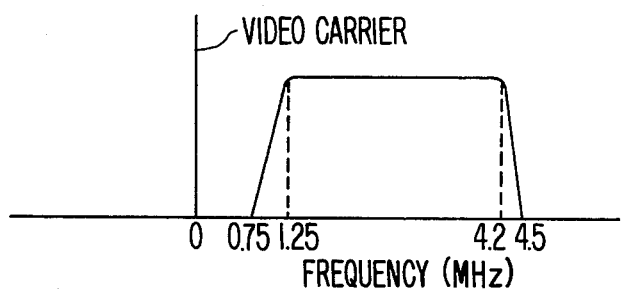
FIG. 6(c) is a characteristic chart showing single side-band transmission during the vestigial side-band transmission of television signals.

The video carrier signal $V_v(t)$ is transmitted by a vestigial sideband transmission, but its transmission characteristic is not like that of the usual vestigital sideband transmission but consists of a double sideband transmission component and a single sideband transmission component. Thus, the vestigital sideband characteristic of the video carrier signal $V_v(t)$ indicated in FIG. 6(a) is a superimposition of the double sideband characteristic of FIG. 6(b) and the single sideband characteristic of FIG. 6(c).

The signal transmitted by double sideband transmission consists solely of a component in phase with the carrier, whereas the signal by single sideband transmission consists of an in-phase component and quadrature component. The in-phase component of double sideband transmission signal $V_v(t)$, the in-phase component of single sideband transmission signal $V_v(t)$ and the quadrature component of single sideband transmission signal $V_v(t)$ are now represented by $I_{I(t)}$, $I_u(t)$ and $Q_{u(t)}$, respectively. Then, the equation (14) may be rewritten as:

$$V_c(t) = -\frac{A^2_o}{8}\{[I_L(t) + I_U(t) + n_c(t)]^2 - [Q_U(t) + n_s(t)]^2\}\sin\theta - \tag{15}$$

$$\frac{A^2_o}{4}[I_L(t) + I_U(t) + n_c(t)][Q_U(t) + n_s(t)]\cos\theta$$

Figure 7:
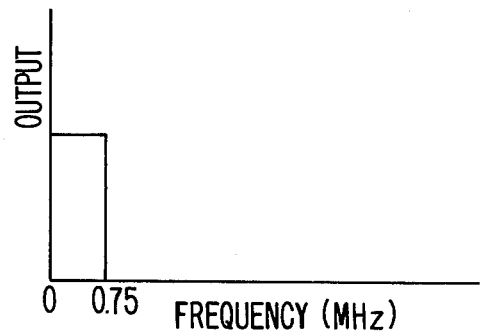
FIG. 7 is a characteristic chart of third and fourth low-pass filters.

If the low pass filtering characteristic of the low pass filters 16 and 17 are equal to or narrower than that of FIG. 7, the following equation holds:

$$V_c(t) = -\frac{A^2_o}{8}\{[I_L(t) + n'_c(t)]^2 - [n'_s(t)]^2\}\sin\theta - \tag{16}$$

$$\frac{A^2_o}{4}[I_L(t) + n'_c(t)][n'_s(t)]\cos\theta$$

where $n'_{c(t)}$ and $n'_{s(t)}$ are the in-phase and quadrature components of the narrow-band gauss noise n(t) after passage through the low pass filter 16.

Let it be assumed that $$I_L(t) \geqq n'_c(t) \text{ and } I_L(t) \geqq n'_s(t), \tag{17}$$

$$V_c(t) = -\frac{A^2_o}{8}[I_L(t)]^2\sin\theta - \frac{A^2_o}{4}[I_L(t)][n'_s(t)]\cos\theta$$

Since $[I_{L(t)}]^2 \neq 0$, the voltage controlled oscillator 20 is controlled so that $\theta = 0$, provided that the loop band-width is sufficiently narrow to eliminate the second term component of FIG. (17). Thus, the phase error $\phi$ between the video carrier signal $V_{v(t)}$ and the output $V_{o(t)}$ of the voltage controlled oscillator 20 is $\phi = 0$.

If the loop band-width is sufficiently narrow to give $\phi = 0$, it simply means that the mean value of $\phi$ is 0, so that the noise component of the second term of FIG. (17) remains to some extent. This noise component gives rise to a fluctuation of the output phase and output frequency of the voltage controlled oscillator 20.

However, the amplitude difference between the second term of equation (17) and the second term of equation (15) is extremely large. Thus, $Q_{u(t)} \geqq n_{s(t)}$ and $\overline{n_{s(t)2}} > \overline{n'_{s(t)2}}$, and the equation (17) does not include $I_{u(t)}$, provided that $\overline{n_{s(t)2}}$ and $\overline{n'_{s(t)2}}$ are the variances of $n_{s(t)}$ and $n'_{s(t)}$, respectively.

Thus, when the low pass filters 16 and 17 are inserted as shown in FIG. 2, the influence of the noise component, i.e. the second term of equation (15) or the second term of equation (14) is significantly decreased.

Moreover, since the bandwidth of the low pass filters 16 and 17 is narrow, the variance of $n'_{s(t)}$, i.e. $\overline{n'_{s(t)2}}$, is decreased in proportion with the band-width. The fluctuation of the output phase and output frequency of the voltage controlled oscillator 20 is reduced by that amount. However, this fluctuation of frequency is not completely eliminated but persists, though to a small extent. This residual fluctuation of frequency leads to frequency fluctuations of the sound signal carrier of the desired receiving channel and the video and sound carriers of the adjacent lower channel because the synchronous detector 10 comprises a voltage multiplier which performs a frequency conversion of the signal from the high frequency input 9 with the output of the voltage controlled oscillator 20.

The television sound signal has been frequency modulated and its maximum frequency deviation is ±25 KHz. If the fluctuation given to the sound signal carrier of the desired receiving channel is about 20 to 30 Hz, the signal-to-noise ratio of the modulated sound signal is about 60 dB and this amount of signal-to-noise ratio is permissible. On the other hand, if a frequency fluctuation of a few Hz to about 20 to 30 Hz is given to the sound carrier of the adjacent lower channel, the frequency spectrum of the chrominance signal of the adjacent lower channel is also fluctuated to similar extent, with the result that it will not be a spectrum such that energy is concentrated at each frame frequency (30 Hz) unlike the spectrum of the baseband video signal and chrominance signal of the desired receiving channel. Moreover, the sound carrier of the adjacent lower channel is also fluctuated in a similar degree but since the sound carrier has been frequency modulated, the spectrum of the carrier sound signal inherently has a frequency width of approximately ±100 KHz.

Figure 8:
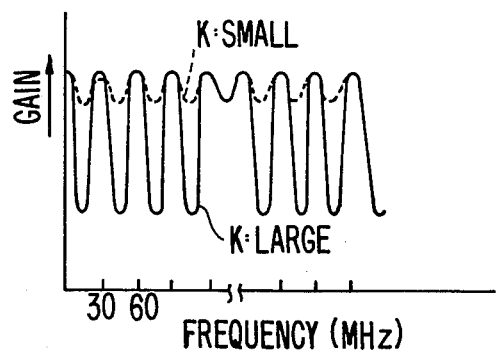
FIG. 8 is a characteristic chart of a motion detector.

The time axis low pass filter consisting of a computing circuit 32, a frame memory 33, a chroma-inverter 34, a motion detector 35, a coefficient generator 36, an address generator 37 and a memory controller 38 is known as a noise reducer. This time axis low pass filter is a recursive filter having a delay circuit for one frame of video signals, and is a circuit for time-wise averaging the video signals for each frame period. As shown in FIG. 8, its frequency characteristic is of the comb type whose peak and valley repeat with a frame frequency. Moreover the depth of valleys in this frequency characteristic varies with coefficient K. This coefficient K is a function of the interframe difference signal examined in the motion detector 35.

Since the spectra of the carrier chrominance signal, sound signal and video signal of the adjacent lower channel as frequency modulated in the frequency detector 10 are partially fluctuating, major portions thereof are removed by the aforementioned motion adaptive time direction low pass filter. Since its operation is motion adaptive, it reduces blurs by making K→0 in the moving pictures and increases the degree of removal of interference signals by increasing the value of K when pictures are more or less frozen. In this manner, the interference from the adjacent lower channel entering into the baseband video signal of the desired receiving channel can be eliminated.

Lastly, the operation of the television receiver according to this embodiment when it is brought into reception state upon selection of the desired channel will be explained below. In accordance with the desired receiving channel input from a control input section 29, the channel selection voltage stored in a voltage memory 27 is selected by a voltage selector 28 and applied to a voltage adder 26. By this channel voltage, the voltage controlled oscillator 20 is controlled to generate a synchronous carrier $V_{o(t)}$. The sound carrier $V_{s(t)}$ and this synchronous carrier $V_{o(t)}$ are applied to the synchronous detector 10 and, as a result, a sound intermediate frequency signal $V_{ps(t)}$ is generated. By the aforementioned frequency capture (pull-in) circuit, the frequency of said synchronous carrier $V_{o(t)}$ is controlled so that the frequency of the signal $V_{ps(t)}$ will be equal to $\omega_{IF}$, which is the difference between the carrier frequency $\omega_{v(t)}$ of the broadcast video carrier $V_{v(t)}$ and the carrier frequency $\omega_s$ of the sound carrier $V_{s(t)}$. When this frequency falls within the frequency capture range of the Costas loop, the Costas loop is rapidly brought into phase lock. As phase lock is established in Costas loop, the video signal $V_{pv(t)}$ and the sound intermediate frequency signal $V_{ps(t)}$ are available from the phase detector 10. These signals pass through the low pass filter 12, etc. and the video signal is outputted to the video output circuit 41 while the sound intermediate frequency signal is demodulated in the frequency discriminator 23 and the resultant demodulated sound signal is outputted to the sound output circuit 42.

In the above-described construction of FIG. 2, the baseband video signal which is synchronously-detected by the Costas loop is filtered in the low pass filter having a low pass band corresponding to the frequency range of the baseband video signal and the frequency of the sound intermediate frequency signal to thereby remove a major portion of energy of the carrier video signal of the adjacent lower channel. Moreover, since this baseband video signal is comb filtered at frame frequency intervals in the time axis low pass filter, a major portion of the interference to the baseband video signal of the desired channel from the carrier chrominance signal and sound signal of the lower adjacent channel can be eliminated. In addition, since the aforesaid time axis low pass filter is a motion-adaptive filter, the above interference-eliminating effect is particularly pronounced when the video signal desired to receive is close to a frozen picture.

However, since in the above construction the signal in the frequency range where no luminance signal spectrum exists among the baseband video signals is also filtered in the time axis low-pass filter, there is encountered a problem in that some of the carrier chrominance signals of the lower adjacent channel remain unremoved.

Therefore, the following construction is proposed as another embodiment of the present invention. This embodiment comprises a voltage controlled oscillator, a 90° phase shifter for effecting a 90° phase shift of the output of said voltage controlled oscillator, a first and a second synchronous detector which process the output of said voltage controlled oscillator and the output of said 90° phase shifter into respective synchronous carriers and effect synchronous detection of the in-phase and quadrature components of the video carrier signal with said respective synchronous carriers, a first and a second low pass filter by which the outputs of said first and second synchronous detectors are low-pass filtered within the frequency range of the video baseband and sound intermediate frequency signal, a phase detector for detecting the phase difference between said video carrier and the output of said voltage controlled oscillator by multiplying the outputs of said first and second low pass filters, a means for feeding back the output of said phase detector to said voltage controlled oscillator, a signal amplifier for amplifying the output of said first low pass filter, an A/D converter for analog-to-digital conversion of the baseband video signal in the output of said signal amplifier, a means for detecting the frequency of the color subcarrier of the adjacent lower channel, a comb filter driven by the output of said A/D converter and having a means for shifting the comb filter frequency by the amount corresponding to the frequency of the color subcarrier of the lower adjacent channel, a subtractor for subtracting the output of said comb filter from the output of said A/D converter and a D/A converter for digital-to-analog conversion of the output of said subtractor. The construction described above enables one to eliminate signals in the frequency range where no luminance signal exists.

The concept underlying this removal of signals in the frequency range free from luminance signal spectrum by the comb filter will now be explained. In the embodiment illustrated in FIG. 2, the output of the first synchronous detector includes, in addition to the baseband video signal of FIG. 5(b), the carrier chrominance signal and sound signal of the lower adjacent channel as shown in FIG. 5(c). Of these signals, the carrier chrominance signal has a frequency spectrum as shown in FIG. 9(a). Thus, referring to FIG. 9(a), the adjacent color signal subcarrier and adjacent video signal carrier are shown to correspond to the adjacent color signal subcarrier and adjacent video signal carrier, respectively, of FIG. 5(c), and the spectrum of the carrier chrominance signal of the adjacent lower channel is represented by dotted lines. However, the spectrum of video signals of the adjacent lower channel is omitted from the drawing for simplicity's sake.

The spectrum represented by solid lines is the spectrum of the video signal of the desired receiving channel. Its interval is equal to the horizontal scanning frequency $f_H$ of the television signal. However, the carrier chrominance signal of the desired receiving channel is not shown. The spectrum of the video signal of the desired receiving channel is not frequency-interlaced with the spectrum of the chrominance signal of the lower adjacent channel by a difference of $\frac{1}{2}$ of $f_H/2$. However, provided that the frequencies of the video carriers of the two channels are exactly as specified, the difference between the frequency of the spectrum of the adjacent lower channel chrominance signal and the frequency of the spectrum of the receiving channel video signal is 2.62 KHz, for $(f_H/2) \times 763 - 6$ MHz$= 2.62$ KHz. Moreover, this frequency difference is not always constant. If the transmission frequency (video signal carrier frequency) of one of the television signals is shifted, the frequency difference between the above two spectra is increased or decreased by that amount.

Therefore, it is desirable to implement a comb filter having the frequency characteristic shown in FIG. 9(b). This comb filter is characterized in that it cuts off the spectrum of the lower adjacent channel carrier chrominance signal shown in dotted lines in FIG. 9(a) and passes the spectrum of the video signal of the desired receiving channel. Moreover, the comb filter frequency is shifted in correspondence with the frequency difference between the video carriers of the two channels.

Figure 10:
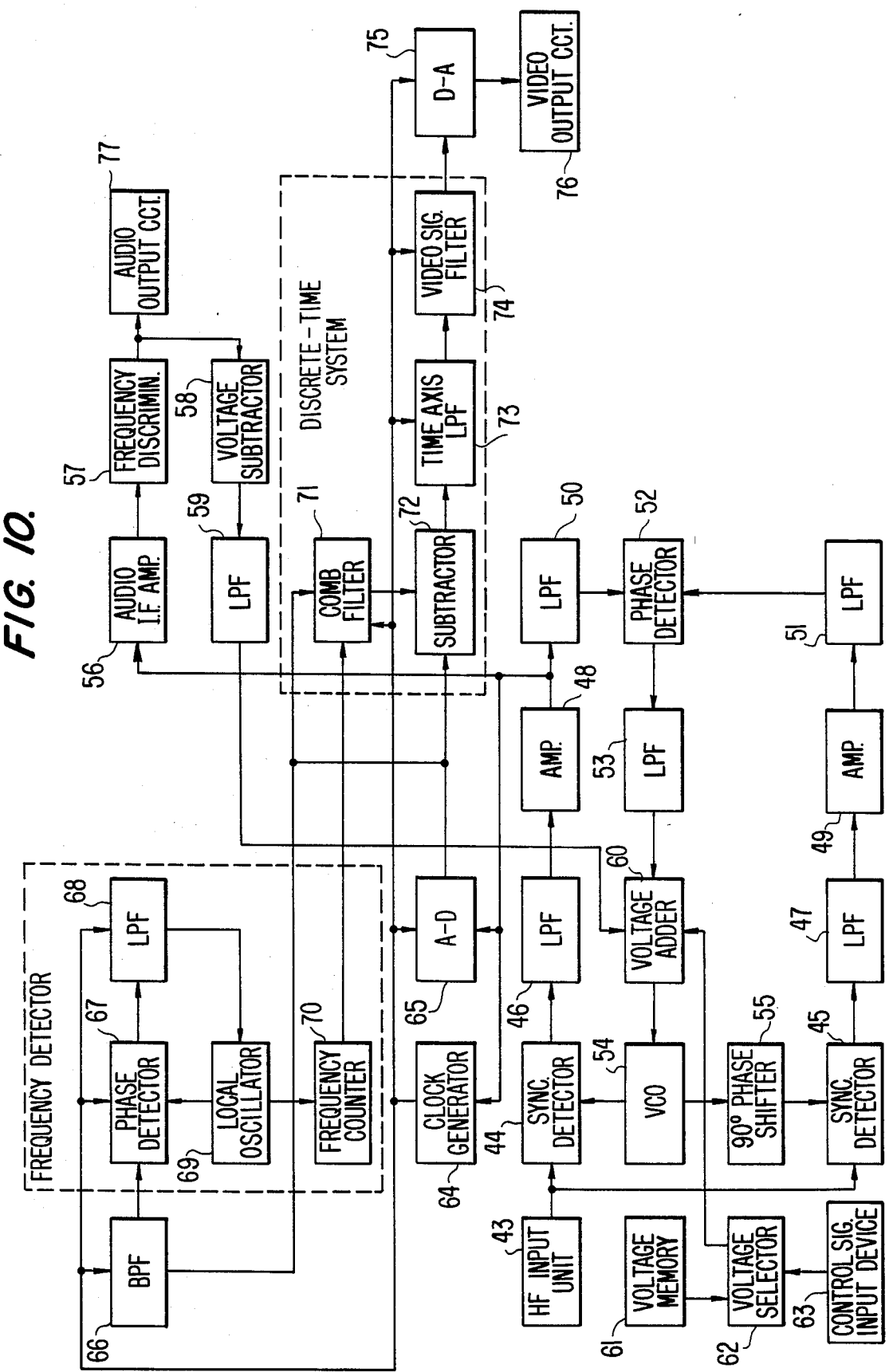
FIG. 10 is a schematic diagram of a television synchronous receiver according to another embodiment of the present invention.

A further embodiment of the present invention will hereinafter be described with reference to the accompanying drawings. FIG. 10 is a block diagram showing main parts of television synchronous receiver as a further embodiment of the present invention. Shown in FIG. 10 are a high frequency input 43, a first synchronous detector 44, a second synchronous detector 45, first and second low pass filters 46 and 47, signal amplifiers 48 and 49, third and fourth low pass filters 50 and 51, a phase detector 52, a Costas loop low pass filter 53, a voltage controlled oscillator 54 and a 90° phase shifter 55, which constitute a Costas loop. Also shown are a sound intermediate frequency amplifier 56, a frequency discriminator 57, a voltage subtractor 58 and a low pass filter 59, which taken together constitute a frequency capture circuit, the output of which is added to the output of the low pass filter 53 of said Costas loop in a voltage adder 60. A voltage memory 61, a voltage selector 62 and a control signal input (63) constitute a channel selection voltage generating circuit. The output voltage of said voltage selector 62 is added to the output of low pass filter 53 of said Costas loop in said voltage adder 60. Element 64 is a clock generator which separates a color burst signal from the output of said signal amplifier 48 and generates a clock signal used as a sampling pulse in accordance with this signal. An A/D converter 65 is used for analog-to-digital conversion of the output of said signal amplifier 48. A band pass filter 66 is used so that the output of said A/D converter is bandpass-filtered with the color subcarrier frequency of the adjacent lower channel as a center frequency. A phase detector 67 is driven by the output of said bandpass filter 66 and constitutes a phase locked loop together with a low pass filter 68 and a local oscillator 69, while a frequency counter 70 is used for counting the output frequency of said local oscillator 69. A comb filter 71 is driven by the output of said A/D converter 65 and haves a means for shifting the comb filter frequency detected by said phase locked loop by the amount corresponding to the frequency of the adjacent lower channel color subcarrier. Also provided are a subtractor 72 which subtracts the output of said comb filter from the output of said A/D converter, and a time axis low pass filter for time axis filtering of the output of said subtractor 72. A video signal filter 74 is provided. A D/A converter 75 is used for digital-to-analog conversion of the output of said video signal filter 74; element 76 is a video output circuit, and element 77 is a sound output circuit.

The construction and operation of the Costas loop, frequency capture circuit, channel selection voltage generating circuit and time axis low pass filter in this embodiment of television synchronous receiver according to the present invention are the same as those of the embodiment illustrated in FIG. 2 and will therefore be not described anew. The following is a further explanation of the aforesaid means for detecting the frequency of the adjacent lower channel color subcarrier, the comb filter which shifts the comb filter frequency by the amount of the detected frequency, and the operation of separating the lower adjacent channel chrominance signal by means of said comb filter and subtractor as essential elements of the particular embodiment.

The center frequency of said band pass filter 66 is equal to the frequency of the lower adjacent channel color subcarrier, which is now designated as $f_0$. The phase locked loop consisting of 67, 68 and 69 is phase-locked to the lower adjacent channel color subcarrier having said frequency $f_0$. This means that the local oscillator 69 oscillates at the frequency $f_0$. The output of this local oscillator 69 is counted by the frequency counter 70 and this frequency $f_0$ is obtained as data. The phase-locked loop, 67, 68, and 69, and the counter 70 form a frequency detector for obtaining the frequency $f_0$.

Figure 11A:
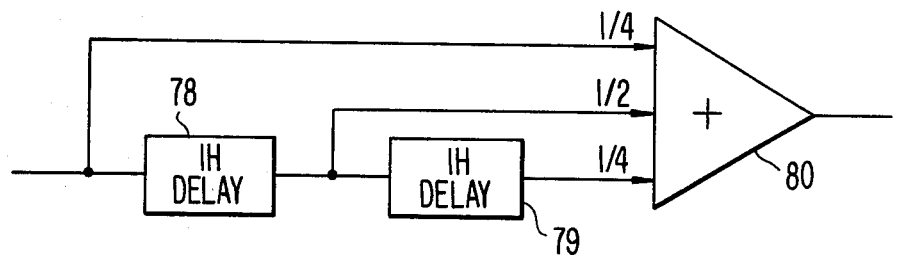
FIG. 11(a) is a schematic view of a conventional 2H comb filter.

FIG. 11(a) shows the construction of the conventional 2H comb filter, wherein 78 and 79 are 1H delay circuits and 80 represent is an adder. Assuming that the impulse response of the filter is $h_i$, its transfer function H(z) is expressed as follows.

$$H(z) = \sum_{i=-N}^{N} h_i z^{-i} \tag{18}$$

where z is a complex number and $z^{-i}$ is a delay of i period as expressed using the unit delay operator $z^{-1}$.

The impulse response $h_i$ of the comb filter shown in FIG. 11(a) is $h_i = \frac{1}{4}$ at $i = -N$; $h_i = \frac{1}{2}$ at $i = 0$; $h_i = \frac{1}{4}$ at $i = N$; and $h_i = 0$ at $i = \pm N$ and $i = $ other than 0; its transfer function $H_1(z)$ is expressed by the following equation.

$$H_1(z) = \tfrac{1}{4}(Z^N + 2 + z^{-N}) \tag{19}$$

where N is an 1H sample number.

The frequency characteristic $H_1(f)$ is obtained by substituting $z^{-1} = e^{-j2\pi f T}$ in equation (19).

$$H_1(f) = \tfrac{1}{4}(e^{j2\pi fNT} + 2 + e^{-j2\pi fNT}) \tag{20}$$

-continued
$$= \tfrac{1}{2}\{1 + \cos(2\pi fNT)\}$$

Figure 12A:
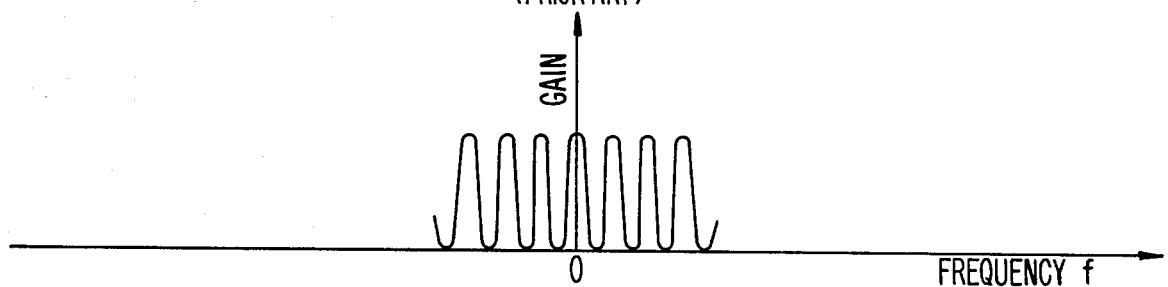
FIG. 12(a) is a frequency characteristic chart of the conventional 2-H comb filter.

This can be diagrammatically represented as illustrated in FIG. 12(a).

Figure 11B:
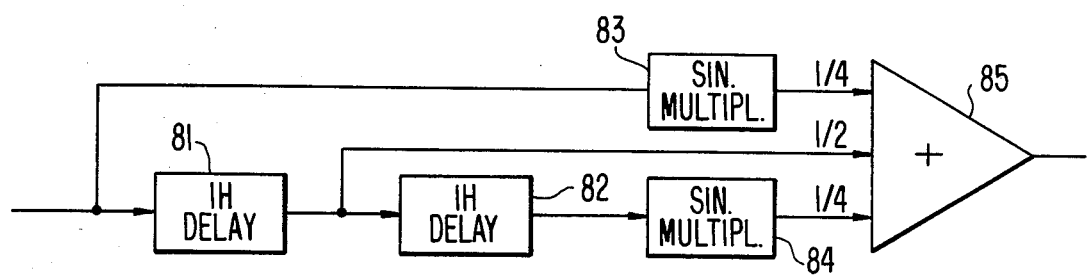
FIG. 11(b) is a schematic view of a 2-H comb filter according to the present invention.

To shift this frequency characteristic by the amount corresponding to frequency $f_0$, the comb filter shown in FIG. 11(b) is constructed. It comprises 1H delay circuits 81 and 82 for delaying the input signal by one horizontal period, sinusoidal multipliers 83 and 84 for multiplying the input signal by a sine function, and an adder 85.

The impulse response of this filter is $h_i=\cos(-2\pi f_0 NT)=\cos(2\pi f_0 NT)$ at $i=-N$; $h_i=1$ at $i=0$ and $h_i=\cos(2\pi f_0 NT)$ at $i=N$, and its transfer function $H_2(z)$ is therefore expressed by the following equation.

$$H_2(z) = \tfrac{1}{2}\{\cos(2\pi f_0 NT)z^N + 2 + \cos(2\pi f_0 NT)z^{-N}\} \quad (21)$$

The frequency characteristic $H_2(f)$ can be written as follows.

$$H_2(f) = \tfrac{1}{2}\{\cos(2\pi f_0 NT)e^{j2\pi fNT} + 2 + \cos(2\pi f_0 NT)e^{-j2\pi fNT}\} \quad (22)$$

$$= \tfrac{1}{2}[1 + \cos\{2\pi(f + f_0)NT\}] + \tfrac{1}{2}[1 + \cos\{2\pi(f - f_0)NT\}]$$

$$= \tfrac{1}{2}H_1(f + f_0) + \tfrac{1}{2}H_1(f - f_0) \quad (23)$$

Figure 12B:
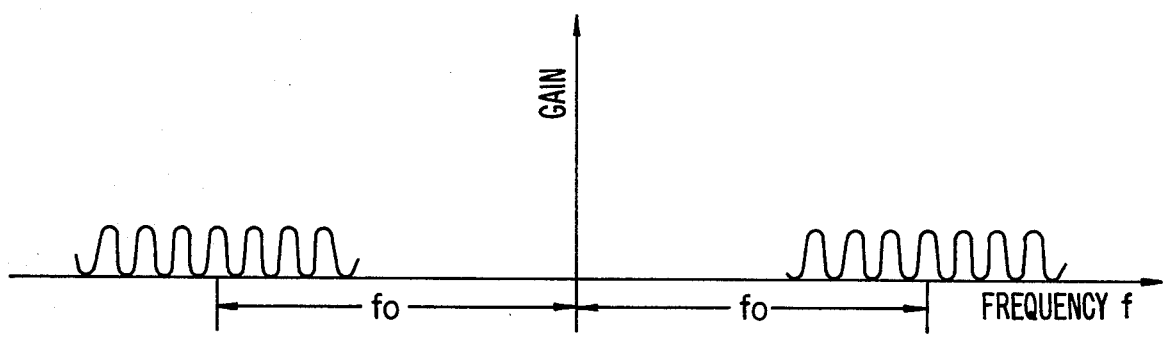
FIG. 12(b) is a characteristic chart of the 2-H comb filter according to the present invention.

The first and second terms of this equation (23) correspond to $H_1(f)$ of equation (20) shifted by $-f_0$ and $f_0$, respectively. This relation is diagrammatically shown in FIG. 12(b).

Since the chrominance signal of the adjacent lower channel exists in the neighborhood of the color subcarrier frequency $f_0$, the comb filter 71 is constructed as a combination of the comb filter of FIG. 11(b) with a following bandpass filter having the pass bandwidth of the chrominance signal about the frequency $f_0$ as a center. The thus-constructed comb filter 71 separates the chrominance signal of the lower adjacent channel from the output of the A/D converter 65. This separated adjacent lower channel chrominance signal is subtracted from the output of the A/D converter by the subtractor 72. The output of said subtractor 72 is thus exclusive of the lower adjacent channel chrominance signal. The output of the subtractor 72 is added to the time direction low pass filter 73 and thereafter the signal is processed in the same manner as already described.

Figure 1:
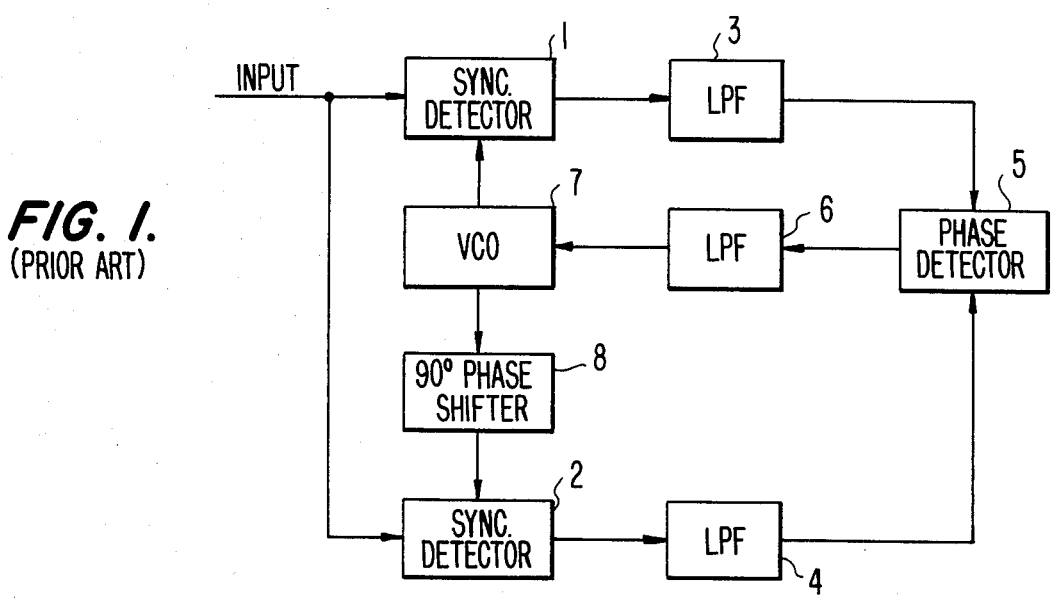
FIG. 1 is a schematic block diagram of a conventional Costas loop synchronous receiver.
Figure 13A:
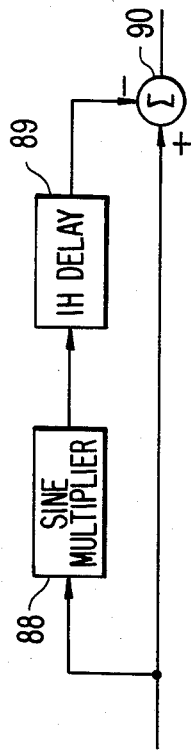
FIG. 13(a) is a schematic view of a conventional 1-H comb filter.
Figure 13B:
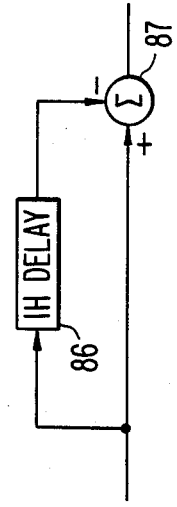
FIG. 13(b) is a characteristic chart of a 1-H comb filter according to the present invention.

Though a 2H comb filter was used as an example in the foregoing explanation, the comb filter frequency can also be shifted by $f_0$ in the same manner as above by applying the construction of FIG. 13(b) to a 1H comb filter. The reference numeral 86 represents a 1H delay circuit, 87 an adder, 88 a sinusoidal multiplier, and 89 a 1H delay circuit.

Figure 14:
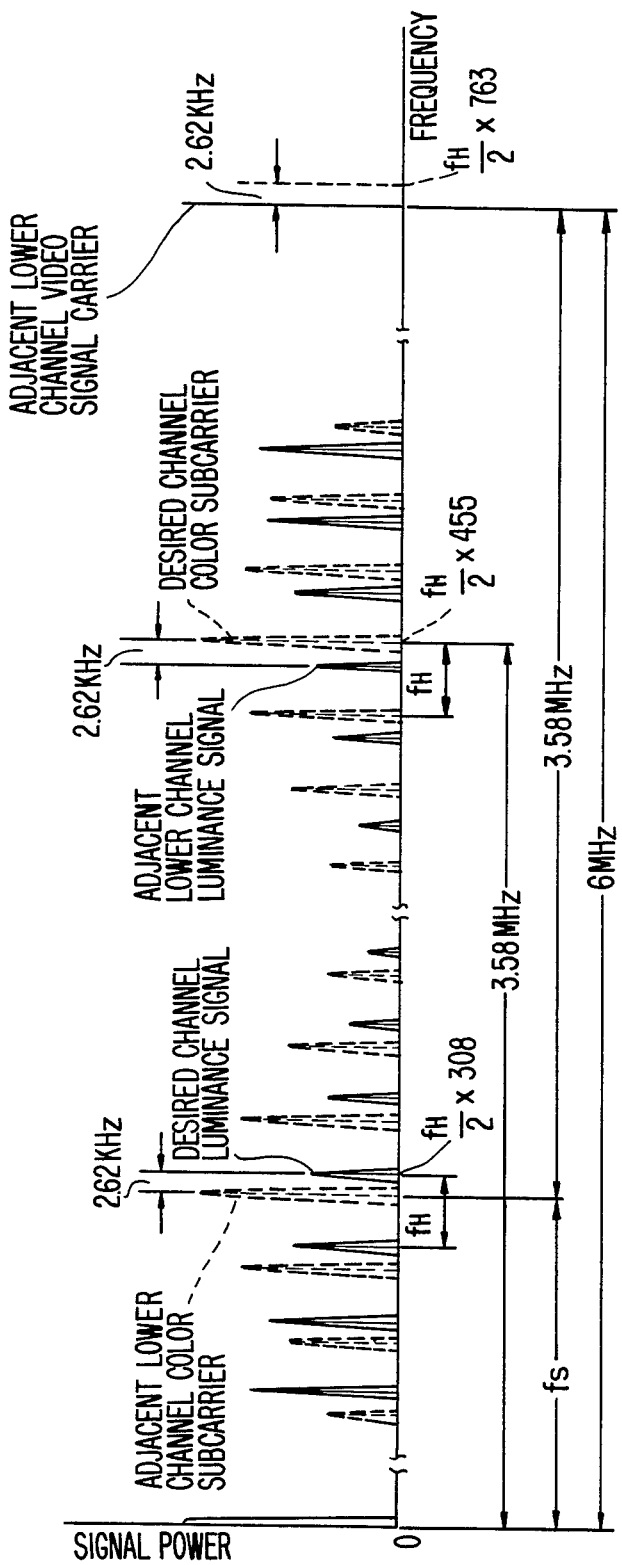
FIG. 14 is a diagram showing frequency relationships between spectra of carrier chrominance signals and remaining luminance signals of the adjacent lower channel and those of luminance signals and carrier chrominance signals of the desired receiving channel as well as indicating the relationship between those spectrum frequencies and a color subcarrier frequency $f_s$ of the adjacent lower channel.

FIG. 14 shows the spectral frequency relationship of the chrominance signal of the lower adjacent channel with the luminance signal of the receiving channel, and that of the luminance signal of the lower adjacent channel with the chrominance signal of the receiving channel. The video signal carrier of the adjacent lower channel is 6 MHz (according to the NTSC system; the same applies hereinafter), and of the integral multiples of ½ of the horizontal scanning frequency $f_H$ (4.5 MHz÷286) of the desired receiving channel, the closest to 6 MHz is $f_H/2 \times 768 = 6.00262$ (MHz). This is the spectral frequency of the receiving channel chrominance signal which is closest to the frequency of the adjacent lower channel video signal carrier. The difference between these frequencies is 2.62 KHz. Therefore, the frequency difference between the spectrum of the adjacent lower channel luminance signal and the spectrum of the receiving channel chrominance signal is equal to 2.62 KHz. Since the frequency difference between the spectrum of the adjacent lower channel chrominance signal and the spectrum of the adjacent lower channel luminance signal and that between the spectrum of the receiving channel luminance signal and the spectrum of the receiving chrominance signal are both equal to $f_H/2$, the spectrum of the adjacent lower channel chrominance signal has a frequency difference of 2.62 KHz from the spectrum of the receiving channel luminance signal.

FIG. 14 shows, also, that the spectrum of each signal has a certain frequency width for each peak. Actually, the spectrum of frame frequency intervals has a peak for each $f_H$. If the change in the level of the vertical axis signal is sharp, this frequency width is increased, while the width is diminished if the change is moderate.

Figure 15:
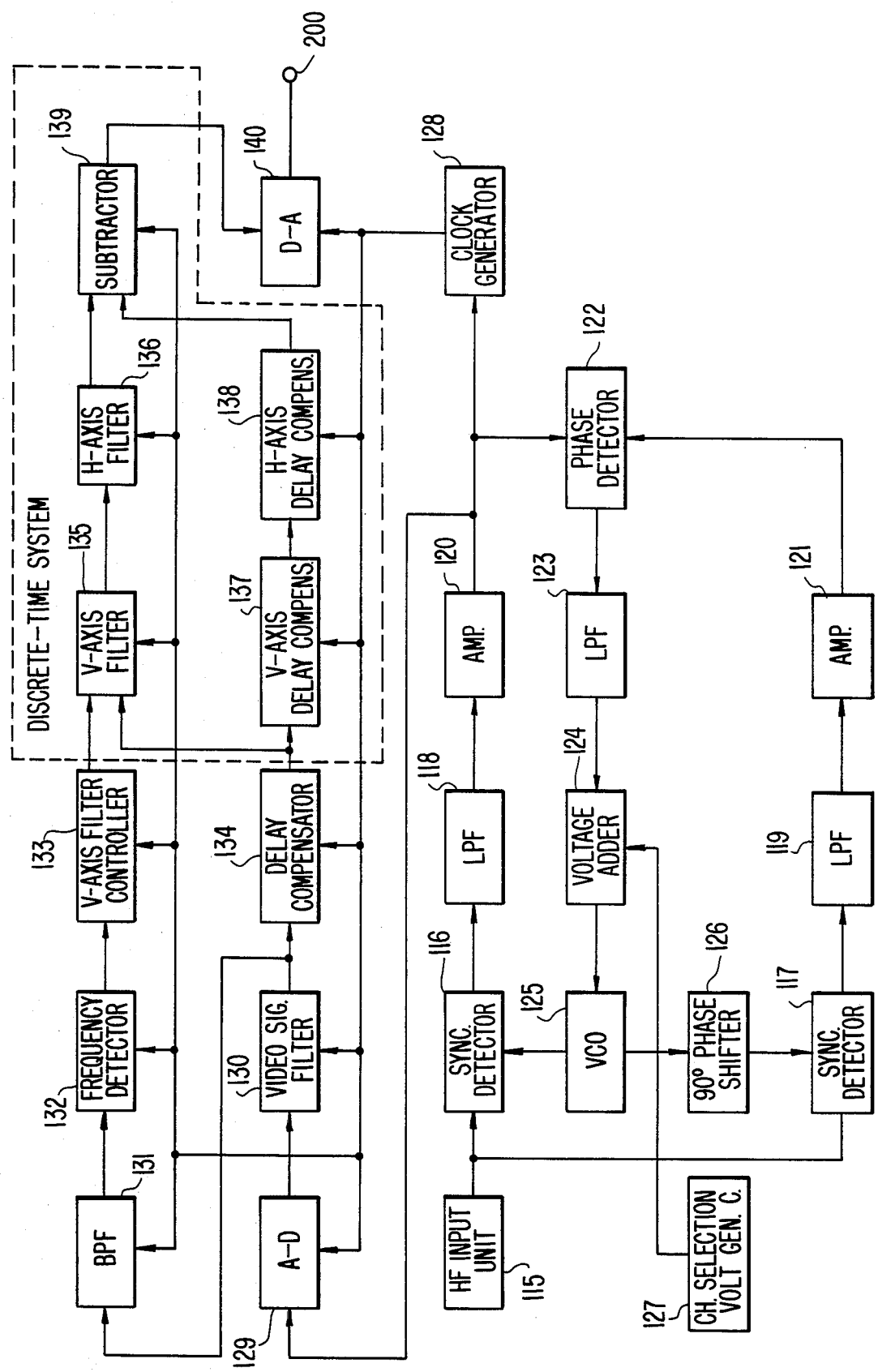
FIG. 15 is a schematic block diagram of still another embodiment of the present invention.

FIG. 15 is a block diagram showing main parts of a still another embodiment of television synchronous receiver according to the present invention. Referring to FIG. 15, 115 is a high frequency input; 116 is a first synchronous detector; 117 is a second synchronous detector; 118 is a first low-pass filter; 119 is a second low-pass filter; 120 is a first signal amplifier; 121 is a second signal amplifier; 122 is a phase detector; 123 is a third low-pass filter; 124 is a voltage adder; 125 is a voltage controlled oscillator; 126 is a 90° phase shifter, and 127 is a channel selection voltage generating circut. These correspond to the respective blocks corresponding to those designated in FIG. 10 and the operations of the respective blocks are similar to those described hereinabefore. The 128 is a clock generator; 129 is an A-D converter; 130 is a video signal filter; 131 is a bandpass filter; 132 is a frequency detector; 133 is a vertical axis filter controller; 134 is a delay compensator; 135 is a vertical axis filter; 136 is a horizontal axis filter; 137 is a vertical axis delay compensator; 138 is a horizontal axis delay compensator; 139 is a subtractor, 140 is a D-A converter and 200 is a video signal output terminal.

The operation of the thus-constructed television synchronous receiver embodying the present invention will now be explained. In this television synchronous receiver, television signals are processed by digital signal processing. Of the output of the first signal amplifier 120, the television synchronous signal or the color burst signal is separated to control the clock generator 128. This output of clock generator 128 is a clock for digital signal processing. The television signal outputted from the first signal amplifier 120 is converted to a digital signal in the A-D converter and added to the video signal filter 130 comprising a digital filter. The frequency characteristic of the video signal filter 130 is the same as the characteristic already described and shown in FIG. 4(b).

Here is envisaged a two-dimensional frequency of a television signal with a horizontal frequency of $\mu$ and a vertical frequency of $\nu$. The unit delay operations in the horizontal and vertical directions are expressed in terms of complex $Z^{-1}$ and $w^{-1}$.
Thus, $$Z^{-1} = e^{-j2\pi\mu\xi_0} \quad (24)$$

$$W^{-1} = e^{-j2\pi\nu\eta_0} \tag{25}$$

where $\xi_o$ and $\eta_o$ are the sampling periods in the horizontal and vertical directions, respectively.

In the vertical axis filter 135, its frequency response is shifted from a given frequency response $H_{vo}(\nu)$ by the amount corresponding to the converted adjacent lower channel color subcarrier frequency $f_s$ but the aforesaid frequency response $H_{vo}(\nu)$ which has not been frequency shifted as yet is now expressed by the following equation.

$$H_{vo}(\ ) = \sum_{n=\infty}^{\infty} h_{vo}(n) e^{-j2\pi\nu\eta_0 n} \tag{26}$$

where $h_{vo}(n)$ is the impulse response corresponding to $H_{vo}(\nu)$. Thus, $$h_{vo}(n) = \frac{1}{\nu_o} \int_{-\frac{\nu_o}{2}}^{\frac{\nu_o}{2}} H_{vo}(\nu) e^{j2\pi\nu\eta_0 n} d\nu \tag{27}$$

where $\nu_o$ is the sampling frequency and $\nu_o = (1/\eta)$.

Let us suppose an ideal low pass filter where $H_{vo}(\nu)$ is as shown in FIG. 16(a). Thus, $-\nu_o/2 < \nu < \nu_o/2$ and $$H_{vo}(\nu) = \begin{cases} 1, & |\nu| \leq \nu_c \\ 0, & c < |\nu| \leq \frac{\nu_o}{2} \end{cases} \tag{28}$$

where $\nu_c$ is the cut-off frequency in the vertical axis. Since $H_{vo}(\nu)$ is periodic, this expression (28) dictates frequency responses for all values of $\nu$. The impulse response $h_{vo}(n)$ is derived from equation (27) and equation (28), $$h_{vo}(n) = \frac{1}{\nu_o} \int_{-\nu_c}^{\nu_c} e^{j2\pi\nu\eta_0 n} d\nu \tag{29}$$

$$= \frac{\sin(2\pi\nu_c\eta_0 n)}{n\pi}$$

Then, for shifting the frequency response $H_{vo}(\nu)$ by the amount corresponding to the converted lower adjacent channel color subcarrier frequency $f_s$, $h_{vo}(n)$ is multiplied by the sine function $\cos(2\pi f_s\eta_0 n)$. As a result, $$h_{vo}(n)\cos(2\pi f_s\eta_0 n) \tag{30}$$

$$= \tfrac{1}{2} \int_{-\nu_c}^{\nu_c} e^{j2\pi\nu\eta_0 n} \cos(2\pi f_s\eta_0 n) d\nu$$

$$= \tfrac{1}{2} \left\{ \frac{\sin[2\pi(\nu + f_s)\eta_0 n]}{n\pi} + \frac{\sin 2\pi(\nu - f_s)\eta_0 n}{n\pi} \right\}$$

Therefore, the frequency response corresponding to the impulse response expressed by equation (30) is $$\tfrac{1}{2} H_{vo}(\nu + f_s) - \tfrac{1}{2} H_{vo}(\nu - f_s) \tag{31}$$

This frequency shift is diagrammatically shown in FIGS. 17(a) and (b). Of these, the product of the second term multiplied by 2 is assumed to be the frequency response $H_{vs}(\nu)$ of the vertical axis filter 135. Thus, $$H_{vs}(\nu) = H_{vo}(\nu - f_s) \tag{32}$$

The equation (32) is such that $H_{vs}(\nu)$ corresponds to $H_{vo}(\nu)$ shifted by $f_s$. The impulse response $h_{vs}(n)$ of the vertical axis filter 135 in this state is $$h_{vs}(n) = 2h_{vo}(n) \cos(2\pi f_s \eta_0 n) \tag{33}$$

Since $h_{vs}(n)$ is a sequence of infinite interval, n is cut off at a suitable number to make a causal impulse response of a finite length n. Thus, the impulse response $h_v(n)$ of the vertical axis filter 135 is set as follows.

$$h_v(n) = \begin{cases} h_{vs}(n), & 0 \leq n \leq N - 1 \\ 0, & \text{for other values of } n \end{cases} \tag{34}$$

Generally, $h_v(n)$ can be expressed as the product of a desired impulse response $h_{vs}(n)$ and a window of finite width $g(n)$. Thus, $h_v(n)$ is a finite sequence of numbers and can be expressed as $$h_v(n) = h_{vs}(n)g(n) \tag{35}$$

In the case of equation (34), the following may be written.

$$g(n) = \begin{cases} 1, & 0 \leq n \leq N - 1 \\ 0, & \text{for other values of } n \end{cases} \tag{36}$$

While the equation (36) represents a square window, any other window $g(n)$, for example a hamming window, can be used.

While as the frequency response $H_{vo}(\nu)$ an ideal low pass filter uas used in equation (28), it may be contemplated to use the frequency response $H_v(\nu)$ where the impulse response $h_v(n)$ is expressed by the following equation. Thus, $$h_v(n) = \begin{cases} 1, & 0 \leq n \leq N - 1 \\ 0, & \text{for other values of } n \end{cases} \tag{37}$$

$$H_v(\nu) = \sum_{n=0}^{N-1} e^{-j2\pi\nu\eta_0 n} = \frac{1 - e^{-j2\pi\nu\eta_0 N}}{1 - e^{-j2\pi\nu\eta_0}} \tag{38}$$

$$= \frac{\sin(\pi\nu\eta_0 N)}{\sin(\pi\nu\eta_0)} e^{-j\pi\nu\eta_0(N-1)}$$

Let us also assume that the frequency response $H_{vo}(\nu)$ of FIG. 16(a) is frequency shifted by $\nu_o/2$ as shown in FIG. 16(b). Thus, $$H_{vo}\left(\nu - \frac{\nu_o}{2}\right) = \begin{cases} 1, & -\frac{\nu_o}{2} \leq \nu \leq \nu_c - \frac{\nu_o}{2} \\ & -\nu_c + \frac{\nu_o}{2} \leq \nu \leq \frac{\nu_o}{2} \\ 0, & \nu_c - \frac{\nu_o}{2} < \nu < -\nu_c + \frac{\nu_o}{2} \end{cases} \tag{39}$$

According to equation (29), the impulse response $h_{vo}(n)$ in this state is as follows.

$$h_{vo}(n) = \frac{\sin\left\{2\pi\left(\nu_c - \frac{\nu_o}{2}\right)\eta_o n\right\}}{n\pi} \quad (40)$$

$$= \frac{\sin(2\pi\nu_c\eta_o n - n\pi)}{n\pi}$$

$$= \begin{cases} \dfrac{\sin(2\pi\nu_c\eta_o n)}{n\pi}, & n \text{ is 0 or an even number} \\ -\dfrac{\sin(2\pi\nu_c\eta_o n)}{n\pi}, & n \text{ is an odd number} \end{cases}$$

Figure 18:
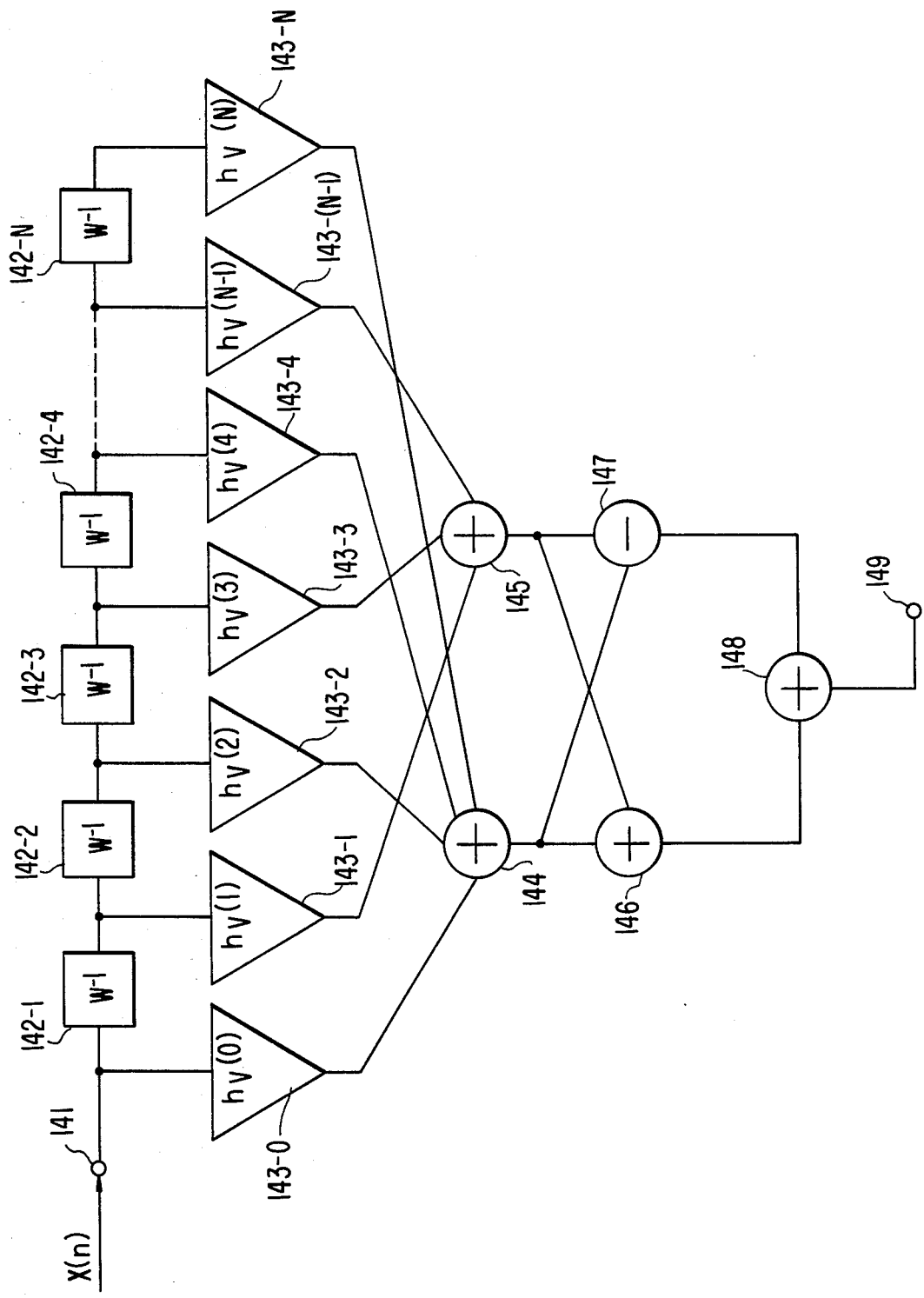
FIG. 18 is a block diagram of a transversal filter.

Using the finite sequence $h_y(n)$ thus obtained as tap gain, a transversal filter of FIG. 18 is constructed. To a terminal 141 is applied the output x(n) from the video signal filter 130 shown in FIG. 15. The reference numerals 141-1, 142-2, and -142-N represent 1H (one-horizontal period) delay circuits, 143-0, 143-1 and -143-N represent multipliers having a gain of $h_y(n)$, 144, 145, and 146 represent adders, and 147 represents a subtractor. The multipliers 143-0, 143-1 and -143-N are connected to taps of said 1H delay circuits 142-1, 142-2 and -142-N. The adder 144 adds the outputs of multipliers 143-0, 143-2, 143-4 and 143-N, the adder 145 adds the outputs of multipliers 143-1, 143-3, . . . 143-(N−1), the adder 146 adds the outputs of multipliers 144 and 154, and the subtractor 147 subtracts the outputs of multipliers 144 and 145. The adder 146 outputs the adjacent lower channel chrominance signal $y(n)_C$, and the subtractor 147 outputs the adjacent lower channel vestigial luminance signal $y(n)_y$. The adder 148 adds $y(n)_C$ and $y(n)_y$ and outputs the result to a terminal 149. The terminal 149 is connected to a horizontal direction filter 136 as shown in FIG. 15.

Figure 19:
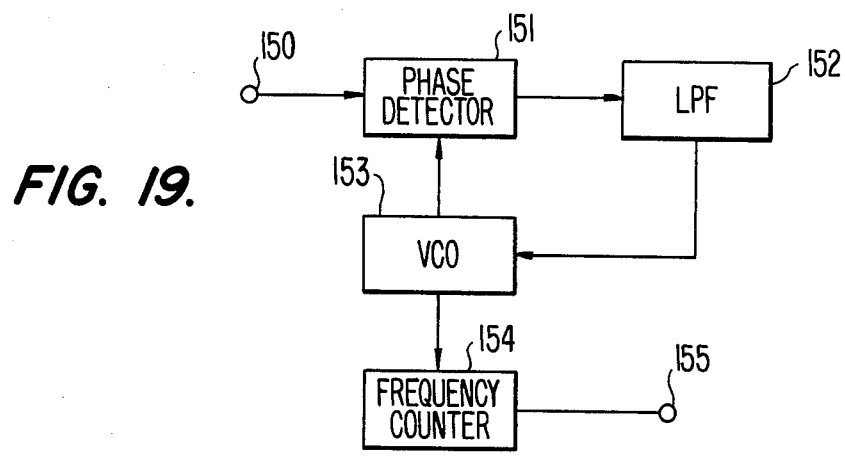
FIG. 19 is a block diagram of a frequency detector.

FIG. 19 shows an exemplary construction of frequency detector 132. The output of an A-D converter in FIG. 15 is inputted to a terminal 150 shown in FIG. 19 through a video signal filter 130 and a bandpass filter 131. The center frequency of the bandpass filter 131 is the converted lower adjacent channel color subcarrier frequency. The signal inputted to a terminal 151 is phase-locked in a phase locked loop consisting of a phase comparator 151, a lowpass filter 152 and a voltage controlled oscillator 153. The output of the voltage controlled oscillator 153 is counted by a frequency counter 154 and the count is outputted from a terminal 155 to a vertical filter controller 133. This count is the converted lower adjacent channel color subcarrier frequency $f_s$. Thus, this frequency is detected by the frequency detector mentioned just above.

Figure 20:
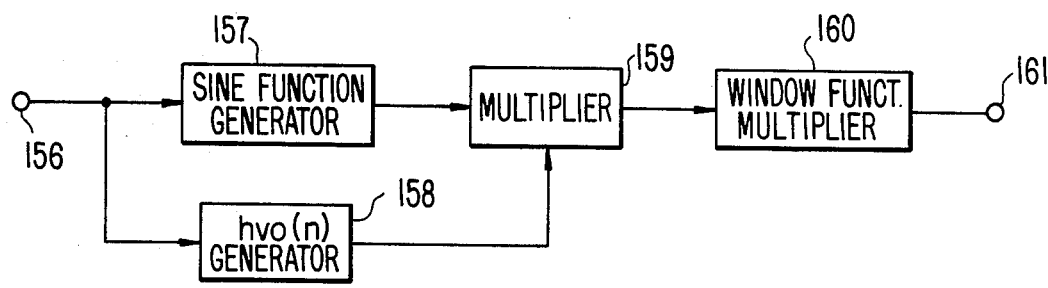
FIG. 20 is a block diagram of a vertical filter control.

FIG. 20 shows an exemplary construction of said vertical axis filter controller 133. Using the converted lower adjacent channel color subcarrier frequency $f_s$ inputted from a terminal 156 as a variable, a sine function cos ($2\pi f_s \eta_o n$) is generated in a sine function generator 157. The $h_{vo}(n)$ generator 158 generates an impulse response $h_{vo}(n)$ corresponding to the frequency response $H_{vo}(\nu)$ prior to frequency conversion of the converted lower adjacent channel color subcarrier frequency $f_s$. The outputs of said sine function generator 157 and $h_{vo}(n)$ generator 158 are multiplied in a multiplier 159 and the product is further multiplied by window function g(n) in a window function multiplier 160. The result $h_y(n)$ of the above operation is outputted from a terminal 161 to the vertical direction filter 135 as a control signal.

The $h_{vo}(n)$ generated in the $h_{vo}(n)$ generator 158 is a function of vertical direction cut-off frequency $\nu_c$. Taking the case of equation (29) as an example, it is $$h_{y0}(n) = \frac{\sin(2\pi\nu_c\eta_o n)}{n\pi} \quad (29')$$

so that this $\nu_c$ will be a function of converted lower adjacent channel color subcarrier frequency $f_s$, the $h_{vo}(n)$ generator is controlled by the frequency $f_s$ inputted from the terminal 156. If the transmission video carrier frequency of the lower adjacent channel varies from the normal frequency, the frequency $f_s$ is altered, with the result that the chrominance signal spectrum and luminance signal spectrum of the lower adjacent channel may approach toward the luminance signal spectrum and chrominance signal spectrum, respectively, of the desired receiving channel (See FIG. 14). In such cases, if the pass bandwidth of $H_{vo}(\nu)$ is broad, portions of the spectra of the desired channel enter the pass band of $H_{vo}(\nu)$. Thus, the quality of signals of the desired receiving channel is adversely affected under the circumstances. That the $h_{vo}(n)$ generator 158 was constructed so that $h_{vo}(n)$ would be a function of $f_s$ is for the purpose of narrowing the pass band width of the vertical direction filter 135 to thereby prevent degradation of signals of the desired receiving channel.

Figure 21A:
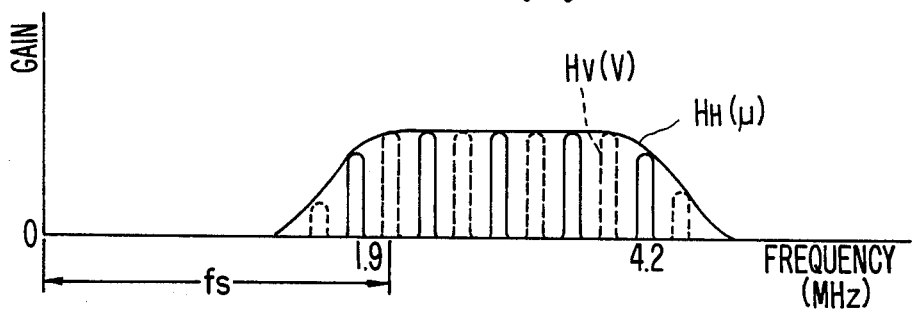
FIGS. 21(a) and 21(b) show the relationships between a frequency response $H_H(\mu)$ of a horizontal filter and a carrier chrominance signal spectrum of the adjacent lower channel and a luminance signal spectrum of the adjacent lower channel.
Figure 21B:
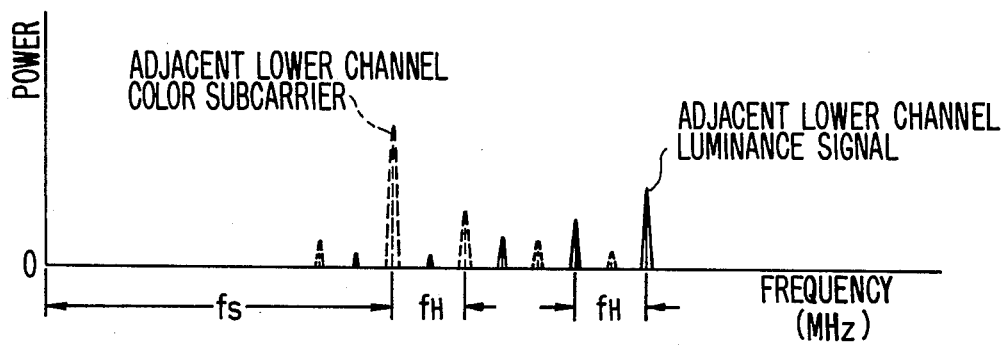

FIG. 21 shows the relationship of the frequency response $H_H(\mu)$ of the horizontal axis filter 136 with the lower adjacent channel chrominance signal spectrum and lower adjacent channel luminance signal spectrum. The frequency at the lower end of the frequency response $H_H(\nu)$ is the frequency 1.9 MHz which is obtainable by subtracting the lower band width 0.5 Mz of the desired channel chrominance signal from the converted lower adjacent channel color subcarrier frequency $f_s$ which is 2.42 MHz, while the frequency at the upper end of the frequency response $H_H(\nu)$ is the spectral frequency 4.2 MHz at the upper end of the receiving channel luminance signal spectrum. The lower channel chrominance signal and luminance signal thus obtained are subtracted from the output of the horizontal direction delay compensator 138 in the subtractor 139. The output of the subtractor 139 is subjected to a digital-to-analog conversion in a D-A converter 140 and the result is outputted from a terminal 200 as a desired channel video signal.

Thus, in this particular embodiment wherein the frequency response of the vertical axis filter 135 is so constructed that the characteristic of the low pass filter is shifted by the amount corresponding to the lower adjacent channel color subcarrier frequency $f_s$, the chrominance signal and luminance signal of the lower adjacent channel are eliminated from the output of the synchronous detector 116 and, consequently, the interference of these signals with the desired channel video signal is precluded.

Figure 22:
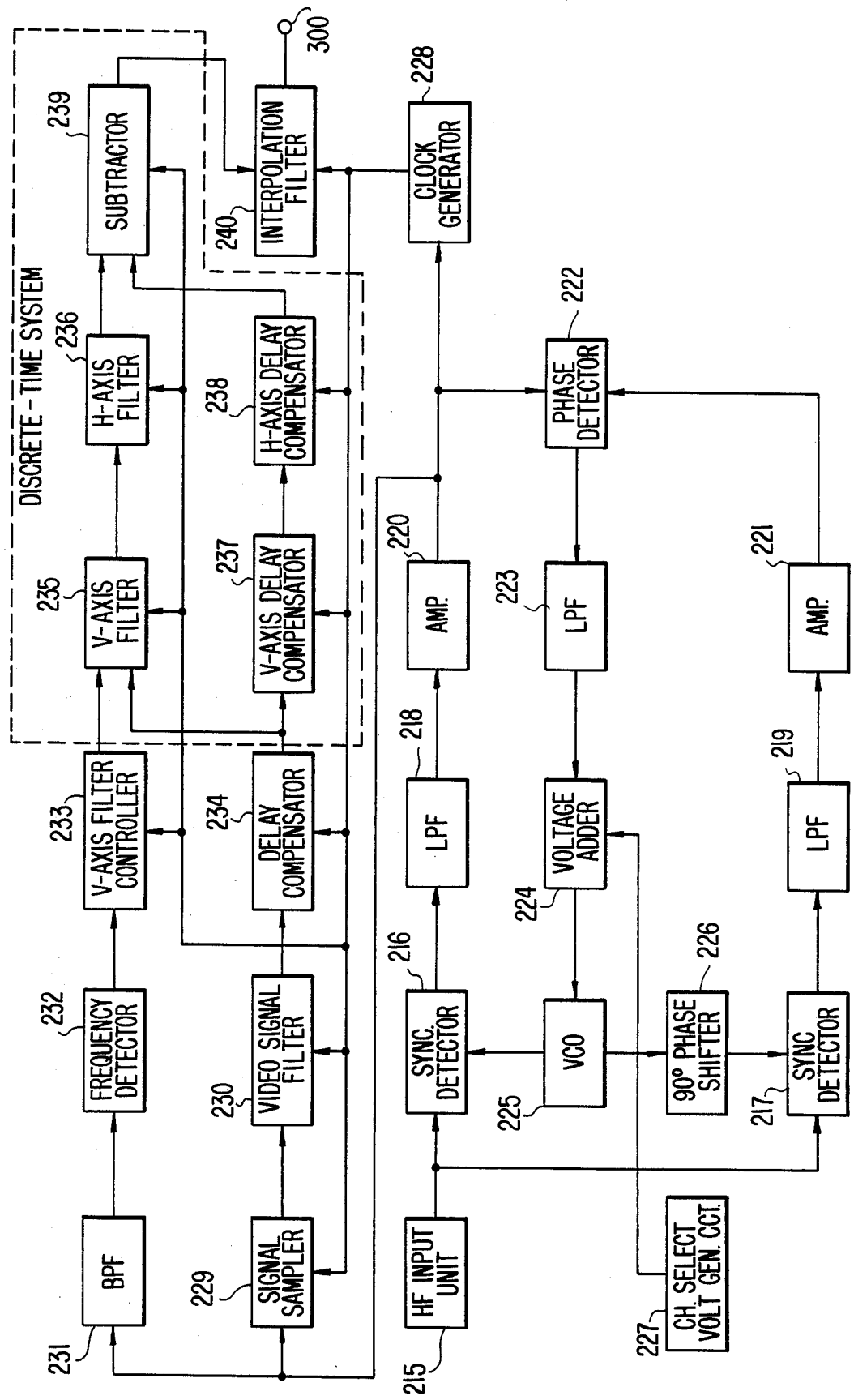
FIG. 22 is a schematic block diagram of a television synchronous receiver according to still another embodiment of the present invention.

FIG. 22 is a block diagram showing main parts of a further embodiment of the television synchronous receiver according to the present invention. Referring to FIG. 22, 215 is a high frequency input; 216 is a first synchronous detector; 217 is a second synchronous detector; 218 is a first low pass filter; 219 is a second low pass filter; 220 is a first signal amplifier; 221 is a second signal amplifier; 222 is a phase detector; 223 is a third low pass filter; 224 is a voltage adder; 225 is a voltage controlled oscillator; 226 is a 90° phase shifter and 227 is a channel selection voltage generating circuit. These blocks respectively correspond to those mentioned with reference to FIG. 10 and the operation of each block is similar to that described for the corresponding block. Element 228 is a clock generator; 229 is a signal sampler; 230 is a video signal filter; 231 is a bandpass filter; 232 is a frequency detector; 233 is a vertical axis filter controller; 234 is a delay compensator; 235 is a vertical axis filter; 236 is a horizontal axis filter; 237 is a vertical axis delay compensator; 238 is a horizontal axis delay compensator; 239 is a subtractor; 240 is an interpolation filter and 300 is a video signal output terminal. The vertical axis filter 235 and the horizontal axis filter 236 can be constructed of charge transfer devices such as charge coupled devices (CCD).

The operation of this embodiment of television synchronous receiver according to the present invention is the same as that of the embodiment shown in FIG. 15 except for the following. In this particular television synchronous receiver, television signals are processed by sampling analog signal processing. Of the output of the first signal amplifier 220, the television synchronous signal or color burst signal is used to control the clock generator 228. The output of this clock generator 228 is a block for sampling analog signal processing. The television signal outputted from the first signal amplifier 220 is converted to a sampling analog signal in the signal sampler 229 and applied to the video signal filter 230 comprising a sampling analog filter. The output of the subtractor 239 is converted to a continuous sequence in the interpolation filter 240 and outputted from a terminal 300 as video signals of the desired receiving channel.

FIG. 23 is a block diagram showing the essential principle of the present invention as a composite of the embodiments shown in FIGS. 2, 10, 15, and 22. Referring to FIG. 23, 301 is a high frequency input; 302 is a first synchronous detector; 303 is a second synchronous detector; 304 and 305 are first and second lowpass filters; 306 and 307 each are signal amplifiers; 308 and 309 are third and fourth lowpass filters; 310 is a phase detector; 311 is a Costas loop lowpass filter; 312 is a voltage controlled oscillator, and 313 is a 90° phase shifter. These blocks form a Costas loop. The element 314 is a clock generator; 314 is a channel selection voltage generating circuit, the output of which is added to the output of lowpass filter 311 in a voltage adder 315 and is applied to the voltage controlled oscillator 312. The element 316 is a signal converter which corresponds to the A-D converter 65 of FIG. 10, the A-D converter 129 of FIG. 15, and the signal sampler 229 of FIG. 22. A signal reverse converter 317 corresponds to the D-A converter 75 of FIG. 10, the D-A converter 140 of FIG. 15, and the interpolation filter 240 of FIG. 22. Element 318 is a clock generator. The signal converter 316 converts the output of the signal amplifier 306 to a discrete-time signal, and said signal reconverter 317 converts the time discrete signal to a time continuous signal. The discrete-time system 319 corresponds to the signal processing systems of FIGS. 2, 10 and 15 and 22 which are driven by the respective elements corresponding to said signal converter 316 and output the result to the respective elements corresponding to said signal reverse converter. .

What is claimed is:

1. A television synchronous receiver for obtaining a video signal of a desired channel, comprising:
a voltage-controlled oscillator (VCO);
a 90° phase shifter for shifting phase of an output of said VCO by 90°;
a first synchronous detector receiving a video carrier signal and the output of said VCO as a synchronous carrier for synchronously detecting in-phase component of the video carrier signal;
a second synchronous detector receiving the video carrier signal and an output of said 90° phase shifter as a synchronous carrier for synchronously detecting quadrature component of the video carrier signal;
first and second low-pass filters for respectively filtering low frequency components of outputs of said first and second synchronous detectors within a frequency range covering a base band of video signal and an audio intermediate frequency;
a phase detector for detecting a phase difference between the video carrier signal and the output of said VCO from outputs of said first and second low-pass filters;
means for feeding an output of said phase detector back to said VCO;
a signal amplifier for amplifying the output of said first low-pass filter;
a signal converter for converting an output of said signal amplifier into a discrete-time signal;
a discrete-time system for processing the discrete-time signal;
a signal reverse converter for reversely converting an output of said discrete-time system into a continuous-time signal to thereby obtain the video signal of the desired channel; and
a clock generator for separating either a television synchronous signal or a color burst signal from the output of said signal amplifier and generating a clock signal from either the television synchronous signal or the color burst signal, the clock signal being used for operating said signal converter, said discrete-time system and said signal reverse converter.

2. A television synchronous receiver as set forth in claim 1, further comprising a third low-pass filter coupled between said first low-pass filter and said phase detector, and a fourth low-pass filter coupled between said second low-pass filter and said phase detector, said third and fourth low-pass filters filtering frequency components of the outputs of said first and second low-pass filters which have a double side band characteristic within vestigial side band of television signal.

3. A television synchronous receiver for obtaining a video signal of a desired channel, comprising:
a voltage-controlled oscillator (VCO);
a 90° phase shifter for shifting phase of an output of said VCO by 90°;
a first synchronous detector receiving a video carrier signal and the output of said VCO as a synchronous carrier for synchronously detecting in-phase component of the video carrier signal;
a second synchronous detector receiving the video carrier signal and an output of said 90° phase shifter as a synchronous carrier for synchronously detecting quadrature component of the video carrier signal;
first and second low-pass filters for respectively filtering low frequency components of outputs of said first and second synchronous detectors within a frequency range covering a base band of video signal and an audio intermediate frequency;

a phase detector for detecting a phase difference between the video carrier signal and the output of said VCO from outputs of said first and second low-pass filters;

means for feeding an output of said phase detector back to said VCO;

a signal amplifier for amplifying the output of said first low-pass filter;

an analog-to-digital (A-D) converter for converting an output of said signal amplifier from analog to digital;

a discrete-time system for processing an output signal of said A-D converter, said discrete-time system comprising a time axis low-pass filter for averaging the output signal of said A-D converter in each frame of video signal;

a digital-to-analog (D-A) converter for converting an output of said discrete-time system from digital to analog to thereby obtain the video signal of the desired channel; and a clock generator for separating either a television synchronous signal or a color burst signal from the output of said signal amplifier and generating a clock signal from either the television synchronous signal or the color burst signal, the clock signal being used for operating said A-D converter, said discrete-time system and said D-A converter.

4. A television synchronous receiver as set forth in claim 3, further comprising a third low-pass filter coupled between said first low-pass filter and said phase detector, and a fourth low-pass filter coupled between said second low-pass filter and said phase detector, said third and fourth low-pass filters filtering frequency components of the outputs of said first and second low-pass filters which have a double side band characteristic within vestigial side band of television signal.

5. A television synchronous receiver as set forth in claim 3, wherein said time axis low-pass filter comprises: computing means for multiplying the output of said A-D converter by 1-K, where K is a coefficient, multiplying an output of a frame memory by K, and adding the output of said A-D converter multiplied by 1-K to the output of said frame memory multiplied by K; said frame memory storing an output of said computing means on a frame-by-frame basis; a motion detector for detecting a motion of an image from one frame to another from a difference between the output of said A-D converter and the output of said frame memory; a coefficient generator for generating said coefficient K from an output of said motion detector; and means for inputting said coefficient K to said computing means.

6. A television synchronous receiver for obtaining a video signal of a desired channel, comprising:

a voltage-controlled oscillator (VCO);

a 90° phase shifter for shifting phase of an output of said VCO by 90°;

a first synchronous detector receiving a video carrier signal and the output of said VCO as a synchronous carrier for synchronously detecting in-phase component of the video carrier signal;

a second synchronous detector receiving the video carrier signal and an output of said 90° phase shifter as a synchronous carrier for synchronously detecting quardrature component of the video carrier signal;

first and second low-pass filters for respectively filtering low frequency components of outputs of said first and second synchronous detectors within a frequency range covering a base band of video signal and an audio intermediate frequency;

a phase detector for detecting a phase difference between the video carrier signal and the output of said VCO from outputs of said first and second low-pass filters;

means for feeding an output of said phase detector back to said VCO;

a signal amplifier for amplifying the output of said first low-pass filter;

an analog-to-digital (A-D) converter for converting an output of said signal amplifier from analog to digital;

a frequency detector for detecting a color subcarrier frequency of an adjacent lower channel to the desired channel from the output of said signal amplifier;

a discrete-time system for processing an output of said A-D converter, said discrete-time system comprising: a comb filter for filtering the output of said A-D converter and having means responsive to an output of said frequency detector for shifting the filtering frequency of said comb filter by an amount corresponding to the color subcarrier frequency of the adjacent lower channel; and a subtractor for subtracting an output of said comb filter from the output of said A-D converter;

a digital-to-analog (D-A) converter for converting an output of said subtractor from digital to analog to thereby obtain the video signal of the desired channel; and a clock generator for separating either a television synchronous signal or a color burst signal from the output of said signal amplifier and generating a clock signal from either the television synchronous signal or the color burst signal, the clock signal being used for operating said A-D converter, said frequency detector, said discrete-time system and said D-A converter.

7. A television synchronous receiver as set forth in claim 6, further comprising a third low-pass filter coupled between said first low-pass filter and said phase detector, and a fourth low-pass filter coupled between said second low-pass filter and said phase detector; said third and fourth low-pass filters filtering frequency components of the outputs of said first and second low-pass filters which have a double side band characteristic within vestigial side band of television signal.

8. A television synchronous receiver as set forth in claim 6, wherein said means for shifting the filtering frequency of said comb filter comprises a sine multiplier for multiplying an impulse response of said comb filter by a sine function with the color subcarrier frequency of the adjacent lower channel as a variable.

9. A television synchronous receiver as set forth in claim 6, wherein said frequency detector is coupled to said A-D converter and comprises: a phase locked loop for phase-locking the output of said A-D converter to a signal obtained by passing the output of said A-D converter through a band-pass filter having a center frequency equivalent to the color subcarrier frequency of the adjacent lower channel; and a counter for counting an output of a voltage controlled oscillator of said phase locked loop.

10. A television synchronous receiver for obtaining a video signal of a desired channel, comprising:
a voltage-controlled oscillator (VCO);

a 90° phase shifter for shifting phase of an output of said VCO by 90°;

a first synchronous detector receiving a video carrier signal and the output of said VCO as a synchronous carrier for synchronously detecting in-phase component of the video carrier signal;

a second synchronous detector receiving the video carrier signal and an output of said 90° phase shifter as a synchronous carrier for synchronously detecting quardrature component of the video carrier signal;

first and second low-pass filters for respectively filtering low frequency components of outputs of said first and second synchronous detectors within a frequency range covering a base band of video signal and an audio intermediate frequency;

a phase detector for detecting a phase difference between the video carrier signal and the output of said VCO from outputs of said first and second low-pass filters;

means for feeding an output of said phase detector back to said VCO;

a signal amplifier for amplifying the output of said first low-pass filter;

an analog-to-digital (A-D) converter for converting an output of said signal amplifier from analog to digital;

a frequency detector for detecting a color subcarrier frequency of an adjacent lower channel to the desired channel from the output of said signal amplifier;

a vertical axis filter controller responsive to an output of said frequency detector for generating an impulse response of a periodic frequency response whose frequency interval is the horizontal scanning frequency with reference to the frequency-converted color subcarrier frequency of the adjacent lower channel;

a discrete-time system for processing an output of said A-D converter, said discrete-time system comprising: a vertical axis filter receiving the output of said A-D converter, frequency response of said vertical axis filter being determined by said impulse response generated by said vertical axis filter controller; a vertical axis delay compensator for compensating a vertical axis delay of the output of said A-D converter; and a subtractor for subtracting an output of said vertical axis filter from an output of said vertical axis delay compensator;

a digital-to-analog (D-A) converter for converting an output of said subtractor from digital to analog to thereby obtain the video signal of the desired channel; and a clock generator for separating either a television synchronous signal or a color burst signal from the output of said signal amplifier and generating a clock signal from either the television synchronous signal or the color burst signal, the clock signal being used for operating said A-D converter, said frequency detector, said vertical axis filter controller, said discrete-time system and said D-A converter.

11. A television synchronous receiver as set forth in claim 10, further comprising a third low-pass filter coupled between said first low-pass filter and said phase detector, and a fourth low-pass filter coupled between said second low-pass filter and said phase detector, said third and fourth low-pass filters filtering frequency components of the outputs of said first and second low-pass filters which have a double side band characteristic within vestigial side band of television signal.

12. A television synchronous receiver as set forth in claim 10, wherein said frequency detector is coupled to said A-D converter and comprises: a phase locked loop for phase-locking the output of said A-D converter to a signal obtained by passing the output of said A-D converter through a band-pass filter having a center frequency equivalent to the color subcarrier frequency of the adjacent lower channel; and a counter for counting an output of a voltage controlled oscillator of said phase locked loop.

13. A television synchronous receiver as set forth in claim 10, wherein said vertical axis filter comprises a transversal filter comprising: a first adder for adding outputs of respective taps of odd-numbered 1H delay elements with weights, where H is a horizontal scanning period; a second adder for adding outputs of respective taps of even-numbered 1H delay elements with weights; a third adder for adding an output of said first adder to an output of said second adder to obtain the color subcarrier frequency of the adjacent lower channel; a subtractor for subtracting the output of said second adder from the output of said first adder to obtain a vestigial video signal of the adjacent lower channel; and a fourth adder for adding an output of said third adder to an output of said subtractor to obtain the output of said vertical axis filter.

14. A television synchronous receiver as set forth in claim 13, wherein said weights at the respective taps of said 1H delay elements are defined as a product of a sine function with the color subcarrier frequency of the adjacent lower channel as a variable and a sequence of fixed values.

15. A television synchronous receiver as set forth in claim 10, wherein said vertical axis filter comprises an adaptive vertical filter which is controlled by said vertical axis filter controller in such a manner that the frequency band of the frequency response of said adaptive vertical filter is narrowed when the color subcarrier of the adjacent lower channel comes close to a luminance signal spectrum frequency of the desired channel.

16. A television synchronous recorder as set forth in claim 10, wherein said vertical axis filter controller comprises: a sine function generator for generating a sine function with the color subcarrier frequency of the adjacent lower channel as a variable; an impulse response generator for determining a frequency response of a desired frequency band; and a multiplier for multiplying outputs of said sine function generator and said impulse response generator.

17. A television synchronous receiver for obtaining a video signal of a desired channel, comprising:

a voltage-controlled oscillator (VCO);

a 90° phase shifter for shifting phase of an output of said VCO by 90°;

a first synchronous detector receiving a video carrier signal and the output of said VCO as a synchronous carrier for synchronously detecting in-phase component of the video carrier signal;

a second synchronous detector receiving the video carrier signal and an output of said 90° phase shifter as a synchronous carrier for synchronously detecting quardrature component of the video carrier signal;

first and second low-pass filters for respectively filtering low frequency components of outputs of said first and second synchronous detectors within a frequency range covering a base band of video signal and an audio intermediate frequency;

a phase detector for detecting a phase difference between the video carrier signal and the output of said VCO from outputs of said first and second low-pass filters;

means for feeding an output of said phase detector back to said VCO;

a signal amplifier for amplifying the output of said first low-pass filter;

a signal sampler for sampling an output of said signal amplifier to obtain a discrete analog signal;

a frequency detector for detecting a color subcarrier frequency of an adjacent lower channel to the desired channel from the output of said signal amplifier;

a vertical axis filter controller responsive to an output of said frequency detector for generating an impulse response of a periodic frequency response whose frequency interval is the horizontal scanning frequency with reference to the frequency-converted color subcarrier frequency of the adjacent lower channel;

a discrete-time system for processing an output of said signal sampler, said discrete-time system comprising: a vertical axis filter receiving the output of said signal sampler, frequency response of said vertical axis filter being determined by said impulse response generated by said vertical axis filter controller; a vertical axis delay compensator for compensating a vertical axis delay of the output of said signal sampler; and a subtractor for subtracting an output of said vertical axis filter from an output of said vertical axis delay compensator; an interpolation filter for interpolating an output of said subtractor to thereby obtain the video signal of the desired channel; and a clock generator for separating either a television synchronous signal or a color burst signal from the output of said signal amplifier and generating a clock signal from either the television synchronous signal or the color burst signal, the clock signal being used for operating said signal sampler, said frequency detector, said vertical axis filter controller, said discrete-time system and said interpolation filter.

18. A television synchronous receiver as set forth in claim 17, further comprising a third low-pass filter coupled between said first low-pass filter and said phase detector, and a fourth low-pass filter coupled between said second low-pass filter and said phase detector, said third and fourth low-pass filters filtering frequency components of the outputs of said first and second low-pass filters which have a double side band characteristic within vestigial side band of television signal.

19. A television synchronous receiver as set forth in claim 17, wherein said vertical axis filter comprises a transversal filter comprising: a first adder for adding outputs of respective taps of odd-numbered 1H delay elements with weights, where H is a horizontal scanning period; a second adder for adding outputs of respective taps of even-numbered 1H delay elements with weights; a third adder for adding an output of said first adder to an output of said second adder to obtain the color subcarrier frequency of the adjacent lower channel; a subtractor for subtracting the output of said second adder from the output of said first adder to obtain a vestigial video signal of the adjacent lower channel; and a fourth adder for adding an output of said third adder to an output of said subtractor to obtain the output of said vertical axis filter.

20. A television synchronous receiver as set forth in claim 19, wherein said weights at the respective taps of said 1H delay elements are defined as a product of a sine function with the color subcarrier frequency of the adjacent lower channel as a variable and a sequence of fixed values.

21. A television synchronous receiver as set forth in claim 17, wherein said vertical axis filter comprises an adaptive vertical filter which is controlled by said vertical axis filter controller in such a manner that the frequency band of the frequency response of said adaptive vertical filter is narrowed when the color subcarrier of the adjacent lower channel comes close to a luminance signal spectrum frequency of the desired channel.

22. A television synchronous recorder as set forth in claim 17, wherein said vertical axis filter controller comprises: a sine function generator for generating a sine function with the color subcarrier frequency of the adjacent lower channel as a variable; an impulse response generator for determining a frequency response of a desired frequency band; and a multiplier for multiplying outputs of said sine function generator and said impulse response generator.

* * * * *